US010245588B2

(12) United States Patent
Khandros et al.

(10) Patent No.: US 10,245,588 B2
(45) Date of Patent: Apr. 2, 2019

(54) PROVIDING DEP MANIPULATION DEVICES AND CONTROLLABLE ELECTROWETTING DEVICES IN THE SAME MICROFLUIDIC APPARATUS

(71) Applicant: Berkeley Lights, Inc., Emeryville, CA (US)

(72) Inventors: Igor Y. Khandros, Orinda, CA (US); Daniele Malleo, El Cerrito, CA (US); J. Tanner Nevill, El Cerrito, CA (US); Steven W. Short, Pleasanton, CA (US); Ming C. Wu, Moraga, CA (US)

(73) Assignee: Berkeley Lights, Inc., Emeryville, CA (US)

( * ) Notice: Subject to any disclaimer, the term of this patent is extended or adjusted under 35 U.S.C. 154(b) by 0 days.

(21) Appl. No.: 15/637,159

(22) Filed: Jun. 29, 2017

(65) Prior Publication Data

US 2018/0126380 A1 May 10, 2018

Related U.S. Application Data

(63) Continuation of application No. 14/262,200, filed on Apr. 25, 2014, now abandoned.

(51) Int. Cl.
*G01N 27/447* (2006.01)
*G01N 27/453* (2006.01)
(Continued)

(52) U.S. Cl.
CPC ... *B01L 3/502761* (2013.01); *B01L 3/502792* (2013.01); *B03C 5/005* (2013.01);
(Continued)

(58) Field of Classification Search
CPC ......... B03C 5/005; B03C 5/026; B03C 5/028; B01L 2400/0427; B01L 2400/0424; B01L 3/502792
See application file for complete search history.

(56) References Cited

U.S. PATENT DOCUMENTS 5,814,200 A 9/1998 Pethig et al.
6,294,063 B1 9/2001 Becker et al.
(Continued)

FOREIGN PATENT DOCUMENTS

EP 2570188 3/2013
KR 10-2010-0008222 A 1/2010
(Continued)

OTHER PUBLICATIONS

Chiou et al., Massively Parallel Manipulation of Single Cells and Microparticles Using Optical Images, Nature 436:370-73 (2005).
(Continued)

*Primary Examiner* — Alexander S Noguerola
(74) *Attorney, Agent, or Firm* — Kenneth E. Horton; Kirton McConkie

(57) ABSTRACT

A structure for providing a boundary for a chamber in a microfluidic apparatus can comprise dielectrophoresis (DEP) configurations each having an outer surface and electrowetting (EW) configurations each having an electrowetting surface. The DEP configurations can facilitate generating net DEP forces with respect to the outer surfaces of the DEP configurations to move micro-objects on the outer surfaces, and the EW configurations can facilitate changing wetting properties of the electrowetting surfaces to move droplets of liquid medium on the electrowetting surfaces.

35 Claims, 15 Drawing Sheets

(51) Int. Cl.

| | |
|---|---|
| ***B01L 3/00*** | (2006.01) |
| ***B03C 5/00*** | (2006.01) |
| ***B03C 5/02*** | (2006.01) |

(52) U.S. Cl.

CPC ....... *B03C 5/026* (2013.01); *B01L 2200/0647* (2013.01); *B01L 2300/0816* (2013.01); *B01L 2300/0819* (2013.01); *B01L 2400/0424* (2013.01); *B01L 2400/0427* (2013.01); *B03C 2201/26* (2013.01)

(56) References Cited

U.S. PATENT DOCUMENTS

| | | | |
|---|---|---|---|
| 6,942,776 | B2 | 9/2005 | Medoro |
| 7,090,759 | B1 | 8/2006 | Seul |
| 8,228,657 | B2 | 7/2012 | Jones et al. |
| 2003/0008364 | A1 | 1/2003 | Wang et al. |
| 2003/0224528 | A1 | 12/2003 | Chiou et al. |
| 2004/0072278 | A1 | 4/2004 | Chou et al. |
| 2004/0191789 | A1 | 9/2004 | Manaresi et al. |
| 2005/0112548 | A1 | 5/2005 | Segawa et al. |
| 2005/0164402 | A1 | 7/2005 | Belisle et al. |
| 2005/0175981 | A1 | 8/2005 | Voldman et al. |
| 2006/0091015 | A1 | 5/2006 | Lau |
| 2006/0186048 | A1 | 8/2006 | Tan |
| 2007/0023292 | A1 | 2/2007 | Kim et al. |
| 2007/0095669 | A1 | 5/2007 | Lau et al. |
| 2008/0274513 | A1 | 11/2008 | Shenderov et al. |
| 2008/0302732 | A1 | 12/2008 | Soh et al. |
| 2009/0170186 | A1 | 7/2009 | Wu et al. |
| 2010/0000620 | A1 | 1/2010 | Fouillet et al. |
| 2010/0003666 | A1 | 1/2010 | Lee et al. |
| 2010/0101960 | A1 | 4/2010 | Ohta et al. |
| 2010/0181195 | A1 | 7/2010 | Garcia Tello |
| 2010/0219076 | A1 | 9/2010 | Yamakawa et al. |
| 2011/0086377 | A1 | 4/2011 | Thwar et al. |
| 2011/0095201 | A1 | 4/2011 | Stolowitz |
| 2011/0117634 | A1 | 5/2011 | Halamish et al. |
| 2012/0024708 | A1 | 2/2012 | Chiou et al. |
| 2012/0118740 | A1 | 5/2012 | Garcia et al. |
| 2012/0325665 | A1 | 12/2012 | Chiou et al. |
| 2013/0026040 | A1 | 1/2013 | Cheng et al. |
| 2013/0118905 | A1 | 5/2013 | Morimoto et al. |
| 2013/0171628 | A1 | 7/2013 | Di Carlo et al. |
| 2013/0190212 | A1 | 7/2013 | Handique et al. |
| 2013/0204076 | A1 | 8/2013 | Han et al. |
| 2013/0206597 | A1 | 8/2013 | Wang et al. |
| 2013/0261021 | A1 | 10/2013 | Bocchi et al. |
| 2014/0116881 | A1 | 5/2014 | Chapman et al. |
| 2014/0124370 | A1 | 5/2014 | Short et al. |
| 2014/0378339 | A1 | 12/2014 | Lammertyn et al. |
| 2015/0107995 | A1 | 4/2015 | Sista et al. |
| 2015/0306598 | A1 | 10/2015 | Khandros et al. |

FOREIGN PATENT DOCUMENTS

| | | | |
|---|---|---|---|
| KR | 2012-006610 | | 6/2012 |
| WO | 2007120241 | A2 | 10/2007 |
| WO | 2010147078 | | 12/2010 |
| WO | 2014036915 | | 3/2014 |

OTHER PUBLICATIONS

Fan et al. Cross-scale Electric Manipulation of Cells and Droplet by Frequency-Modulated Dielectrophoresis and Electrowetting, Lab Chip, 2008, 8, 1325-1331.

Pei et al., Light-Actuated Digital Microfluidics for Large-Scale, Parallel Manipulation of Arbitrarily Sized Droplets, 2010 IEEE 23rd Intl. Conf. on MEMS, pp. 252-255.

WO2010147078 Univerity of Tokyo, Dec. 23, 2010, Machine Translation.

Valley et al., A Unified Platform for Optoelectrowelling and Optoelectronic Tweezers, Lab on a Chip 11:1292-97 (2011).

KIPO Computer-Generated English Language Translation of KR 10-2012-0066100 Gwang-Seok Yang, Patent Published Jun. 22, 2012.

International Search Report and Written Opinion for PCT Application Serial No. PCT/2015/027680 (dated Jun. 29, 2015), 9 pages.

International Search Report and Written Opinion for PCT Application Serial No. PCT/2015/027679 (dated Jul. 27, 2015), 11 pages.

Valley et al., Optoelectronic Tweezers as a Tool for Parallel Single-Cell Manipulation and Stimulation, IEEE Transactions on Biomedical Circuits and Systems 3(6):424-30 (2009).

Fuchs, Electronic sorting and recovery of single live cells from microlitre sized samples, Lab on a Chip 6:121-26 (2006).

PROVIDING DEP MANIPULATION DEVICES AND CONTROLLABLE ELECTROWETTING DEVICES IN THE SAME MICROFLUIDIC APPARATUS

CROSS REFERENCE TO RELATED APPLICATION(S)

This application is a continuation of U.S. patent application Ser. No. 14/262,200 filed on Apr. 25, 2014, which is incorporated herein by reference in its entirety.

BACKGROUND

Micro-objects, such as biological cells, can be processed in a microfluidic apparatus. For example, micro-objects suspended in a liquid in a microfluidic apparatus can be sorted, selected, and moved in the apparatus. The liquid can also be manipulated in the device. Embodiments of the present invention are directed to improvements in manipulating micro-objects and liquid in the same microfluidic apparatus.

SUMMARY

In some embodiments, a structure can comprise a dielectrophoresis (DEP) configuration comprising an outer surface and an electrowetting (EW) configuration comprising an electrowetting surface. The DEP configuration can be disposed adjacent to the EW configuration such that the outer surface of the DEP configuration is adjacent to the electrowetting surface.

Some embodiments of the invention can be directed to a process of operating a microfluidic apparatus comprising a chamber, dielectrophoresis (DEP) devices, and electrowetting (EW) devices. The process can include moving a micro-object from a first outer surface of a first of the DEP devices to a second outer surface of a second of the DEP devices. This can be accomplished by activating the second DEP device and thereby creating a net DEP force on the micro-object in a direction of the second DEP device. The process can further include moving a droplet of a liquid medium from a first location to a second location in the chamber by activating a second of the EW devices and thereby changing a wetting property of a second electrowetting surface of the second EW device. In the first location, the droplet can be disposed in part on a first electrowetting surface of a first of the EW devices but not on the second electrowetting surface of the second EW device. In the second location, the droplet can be disposed in part on the second electrowetting surface of the second EW device but not on the first electrowetting surface of the first EW device.

Some embodiments of the invention can be directed to such a process that includes disposing a droplet of a first liquid medium on first outer surfaces of a first set of the DEP devices and first electrowetting surfaces of a first set of the EW devices. The process can also include separating a first part of the droplet from a second part of the droplet by activating second electrowetting surfaces of a second set of the EW devices and thereby changing a wetting property of the second electrowetting surfaces.

DETAILED DESCRIPTION OF EXEMPLARY EMBODIMENTS

Figure 1:
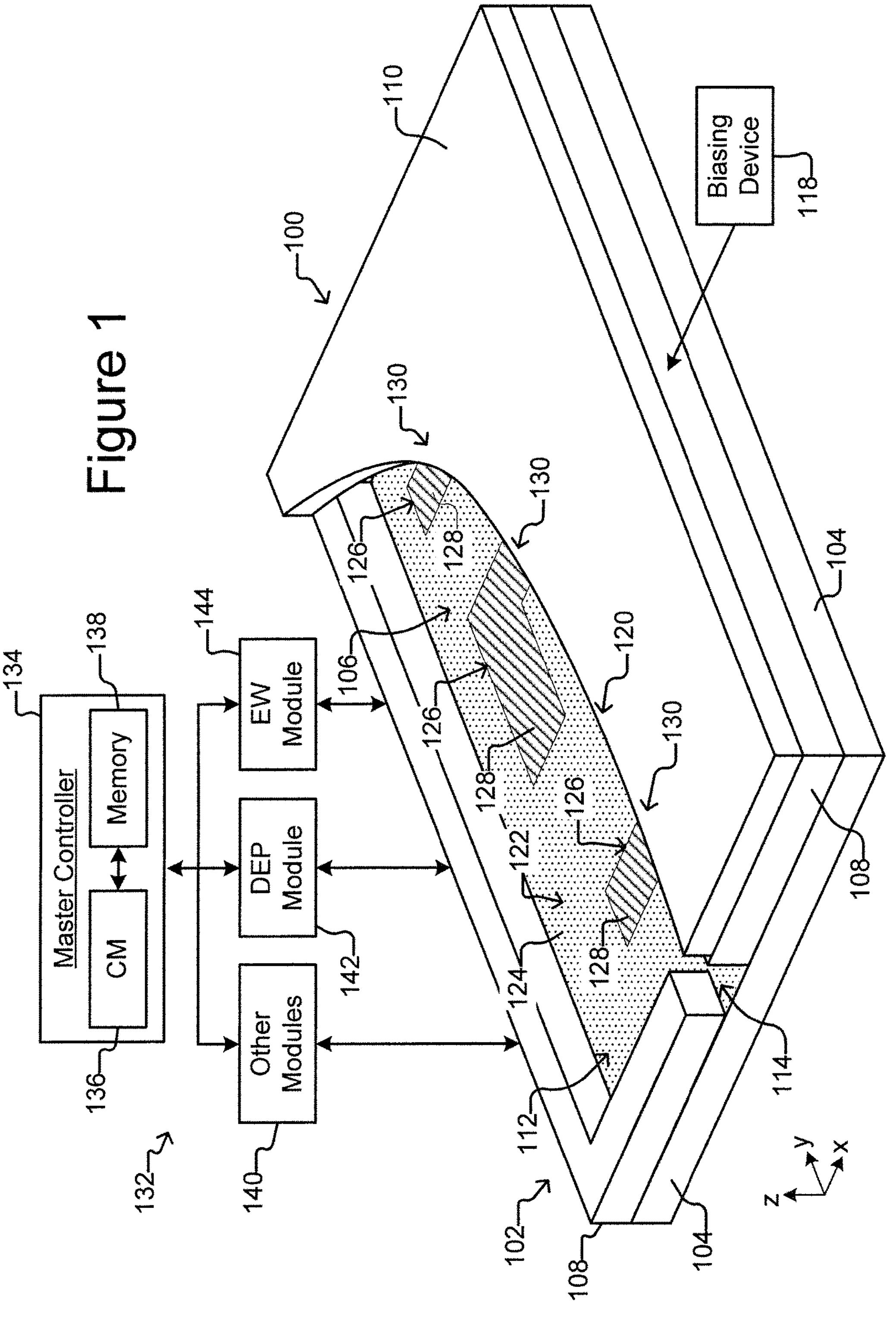
FIG. 1 illustrates a perspective view of an example of a microfluidic apparatus with a structure comprising dielectrophoresis (DEP) configurations and electrowetting (EW) configurations according to some embodiments of the invention.

This specification describes exemplary embodiments and applications of the invention. The invention, however, is not limited to these exemplary embodiments and applications or to the manner in which the exemplary embodiments and applications operate or are described herein. Moreover, the figures may show simplified or partial views, and the dimensions of elements in the figures may be exaggerated or otherwise not in proportion. In addition, as the terms "on," "attached to," or "coupled to" are used herein, one element (e.g., a material, a layer, a substrate, etc.) can be "on," "attached to," or "coupled to" another element regardless of whether the one element is directly on, attached to, or coupled to the other element or there are one or more intervening elements between the one element and the other element. Also, directions (e.g., above, below, top, bottom, side, up, down, under, over, upper, lower, horizontal, vertical, "x," "y," "z," etc.), if provided, are relative and provided solely by way of example and for ease of illustration and discussion and not by way of limitation. In addition, where reference is made to a list of elements (e.g., elements a, b, c), such reference is intended to include any one of the listed elements by itself, any combination of less than all of the listed elements, and/or a combination of all of the listed elements. The same reference numbers are used throughout the drawings and specification to refer to the same element.

As used herein, "substantially" means sufficient to work for the intended purpose. The term "substantially" thus allows for minor, insignificant variations from an absolute or perfect state, dimension, measurement, result, or the like such as would be expected by a person of ordinary skill in the field but that do not appreciably affect overall performance. When used with respect to numerical values or parameters or characteristics that can be expressed as numerical values, "substantially" means within ten percent. The term "ones" means more than one.

As used herein, the term "micro-object" can encompass one or more of the following: inanimate micro-objects such as micro-particles, micro-beads, micro-wires, and the like; biological micro-objects such as cells (e.g., proteins, embryos, plasmids, oocytes, sperms, hydridomas, and the like); and/or a combination of inanimate micro-objects and biological micro-objects (e.g., micro-beads attached to cells).

The phrase "relatively high electrical conductivity" is used herein synonymously with the phrase "relatively low electrical impedance," and the foregoing phrases are interchangeable. Similarly, the phrase "relatively low electrical conductivity" is used synonymously with the phrase "relatively high electrical impedance," and the foregoing phrases are interchangeable.

A "fluidic circuit" means one or more fluidic structures (e.g., chambers, channels, pens, reservoirs, or the like), which can be interconnected. A "fluidic circuit frame" means one or more walls that define all or part of a fluidic circuit. A "droplet" of liquid medium includes a single droplet or a plurality of droplets that together form a single volume of the liquid medium.

Some embodiments of the invention include a structure comprising a structural boundary (e.g., a floor, ceiling, or side) of a chamber or other fluidic structure in a microfluidic apparatus. The structure can comprise one or more dielectrophoresis (DEP) configurations each having an outer surface and one or more electrowetting (EW) configurations each having an electrowetting surface. The boundary can comprise the outer surfaces of the DEP configurations and the electrowetting surfaces of the EW configurations. The DEP configurations can facilitate generating net DEP forces with respect to the outer surfaces of the DEP configurations to move micro-objects on the outer surfaces, and the EW configurations can facilitate changing a wetting property of the electrowetting surfaces to move droplets of liquid medium. Such a structure can be part of a microfluidic apparatus, and can thus provide in one microfluidic apparatus the ability both to manipulate micro-objects on the outer surfaces of the DEP configurations and to manipulate droplets of medium on the electrowetting surfaces of the EW configurations.

FIG. 1 illustrates an example of a microfluidic apparatus 100 that can include a structure 104 that comprises both DEP configurations 122 and EW configurations 126. Also shown are examples of control equipment 132 for controlling operation of the apparatus 100. Although the apparatus 100 can be physically structured in many different ways, in the example shown in FIG. 1, the apparatus 100 is depicted as including an enclosure 102 that comprises a structure 104 (e.g., a base), a fluidic circuit frame 108, and a cover 110, which define a fluidic chamber 112 in which one or more liquid media can be disposed.

As noted, the structure 104 can comprise one or more DEP configured sections 122 (hereinafter "DEP configurations") and one or more EW configured sections 126 (hereinafter "EW configurations"). Each DEP configuration 122 can comprise an outer surface 124 and can be configured to temporarily create a net DEP force on a micro-object (not shown in FIG. 1) in a liquid medium (not shown in FIG. 1) on the outer surface 124. In some embodiments, the outer surface 124 can be hydrophilic. Each EW configuration 126 can comprise an electrowetting surface 128 and can be configured to temporarily change a wetting property of the electrowetting surface 128 or a region of the electrowetting surface 128. For example, the electrowetting surface 128 can be hydrophobic but the EW configuration 126 can be configured to temporarily change the electrowetting surface 128 or a region of the electrowetting surface 128 to be less hydrophobic or even hydrophilic.

Although FIG. 1 illustrates the structure 104 as comprising one relatively large DEP configuration 122 with multiple EW configurations 126 disposed in the DEP configuration 122, the foregoing is but an example. As another example, the structure 104 can comprise one relatively large EW configuration 126 (e.g., in place of the DEP configuration 122 in FIG. 1) and multiple DEP configurations 122 (e.g., in place of the EW configurations 126 in FIG. 1). As yet another example, the structure 104 can comprise multiple DEP configurations 122 and multiple EW configurations 126.

Regardless, the structure 104 can comprise a structural boundary 106 (e.g., a floor, ceiling, or side) of one or more fluidic portions of a fluidic circuit defined by the fluidic circuit frame 108. In the example shown in FIG. 1 the structural boundary 106 can be a floor of the chamber 112 as shown. Regardless, the structural boundary 106 can comprise the outer surfaces 124 of the DEP configurations 122 and the electrowetting surfaces 128 of the EW configurations 126. The boundary 106 of the structure 104 can thus be a composite surface of one or more outer surfaces 124 of one or more DEP configurations 122 and one or more electrowetting surfaces 128 of one or more EW configurations 126.

Figure 7:
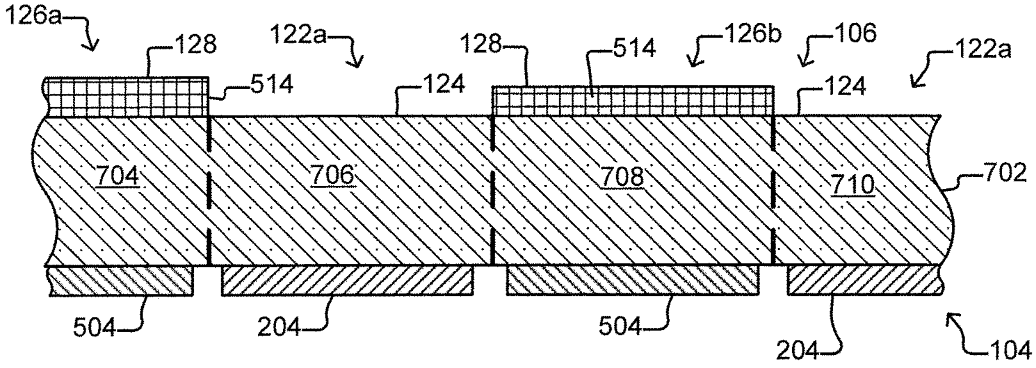
FIG. 7 illustrates an example in which a structure of the microfluidic apparatus of FIG. 1 comprises DEP configurations and EW configurations integrated into a single, monolithic switchable element according to some embodiments of the invention.
Figure 8:
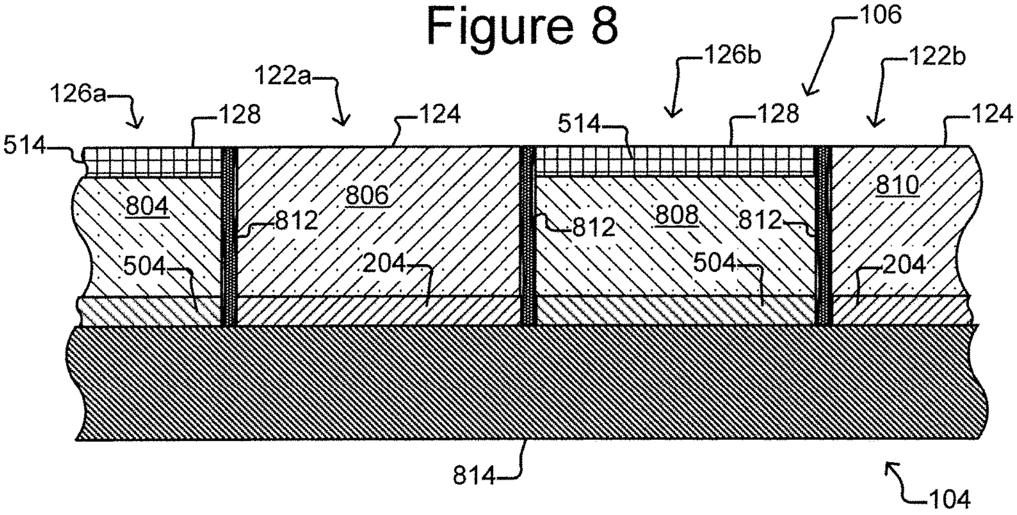
FIG. 8 shows an example in which the structure of the microfluidic apparatus of FIG. 1 comprises structurally distinct DEP configurations and structurally distinct EW configurations according to some embodiments of the invention.

The outer surfaces 124 and the electrowetting surfaces 128 can be substantially parallel. In some embodiments, the outer surfaces 124 and the electrowetting surfaces 128 can also be in substantially the same plane (e.g., as illustrated in FIGS. 1 and 8), and the structural boundary 106 of the structure 104 can thus be substantially planar. In other embodiments, the outer surfaces 124 and the electrowetting surfaces 128 are not in the same plane but can nevertheless be substantially parallel (e.g., as in the example shown in FIG. 7).

Figure 11:
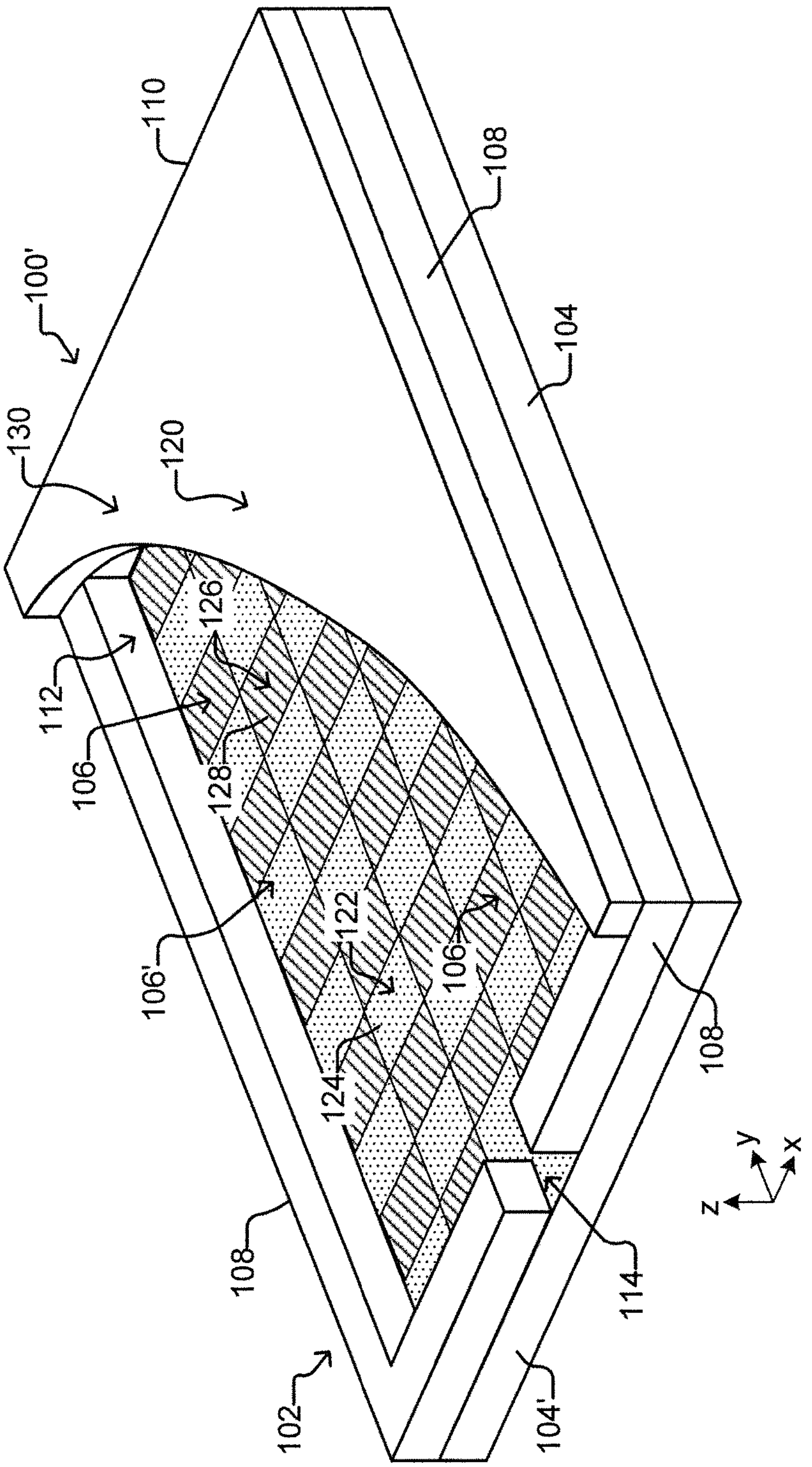
FIG. 11 illustrates an embodiment of the microfluidic apparatus of FIG. 1 comprising DEP devices and EW devices disposed in alternating patterns according to some embodiments of the invention.

Each DEP configuration 122 (and thus each outer surface 124) and each EW configuration 126 (and thus each electrowetting surface 128) can have any desired shape. Moreover, the DEP configurations 122 (and thus the outer surfaces 124) and the EW configurations 126 (and thus the electrowetting surfaces 128) can be disposed in any desired pattern. FIG. 11 (which is discussed below) illustrates an example in which the structure 104 comprises multiple DEP configurations 122 and multiple EW configurations 126 disposed in alternating patterns.

As shown in FIG. 1, the fluidic circuit frame 108 can be disposed on the structure 104 (e.g., on the boundary 106 of the structure 104), and the cover 110 can be disposed over the fluidic circuit frame 108. With the boundary 106 of the structure 104 as the bottom and the cover as the top 110, the fluidic circuit frame 108 can define a fluidic circuit comprising, for example, interconnected fluidic chambers, channels, pens, reservoirs, and the like. In the example illustrated in FIG. 1, the fluidic circuit frame 108 defines a chamber 112, and the boundary 106 of the structure 104 can be, for example, a lower boundary of the chamber 112. Although the structure 104 is shown in FIG. 1 as comprising the bottom of the apparatus 100 and the cover 110 is illustrated as the top, the structure 104 can be the top and the cover 110 can be the bottom of the apparatus 100. As also shown, the chamber 112 can include one or more inlets 114 and one or more similar outlets (not shown).

The structure 104 can comprise, for example, a substrate or a plurality of interconnected substrates. For example, the structure 104 can comprise a semiconductor substrate, a printed circuit board substrate, or the like. The fluidic circuit frame 108 can comprise a flexible material (e.g. rubber, plastic, an elastomer, silicone, polydimethylsioxane ("PDMS"), or the like), which can be gas permeable. The cover 110 can be an integral part of the fluidic circuit frame 108, or the cover 110 can be a structurally distinct element (as illustrated in FIG. 1). The cover 110 can comprise the same or different materials than the fluidic circuit frame 108. Regardless, the cover 110 and/or the structure 104 can be transparent to light.

FIG. 1 also illustrates examples of control equipment 132 that can be utilized with the microfluidic apparatus 100. Examples of such control equipment 132 include a master controller 134, a DEP module 142 for controlling the DEP devices 120 of which the DEP configurations 122 of the structure 104 are a part, and an EW module 144 for controlling EW devices 130 of which the EW configurations 126 of the structure 104 are a part. The control equipment 132 can also include other modules 140 for controlling, monitoring, or performing other functions with respect to the microfluidic apparatus 100.

The master controller 134 can comprise a control module 136 and a digital memory 138. The control module 136 can comprise, for example, a digital processor configured to operate in accordance with machine executable instructions (e.g., software, firmware, microcode, or the like) stored in the memory 138. Alternatively or in addition, the control module 136 can comprise hardwired digital circuitry and/or analog circuitry. The DEP module 142, the EW module 144, and/or the other modules 140 can be similarly configured. Thus, functions, processes, acts, actions, or steps of a process discussed herein as being performed with respect to the apparatus 100 can be performed by one or more of the master controller 134, DEP module 142, EW module 144, or other modules 140 configured as discussed above.

As also shown in FIG. 1, an electrical biasing device 118 can be connected to the apparatus 100. The electrical biasing device 118 can, for example, comprise one or more voltage or current sources.

As can be seen in FIG. 1, each DEP configuration 122 of the structure 104 can be part of a different DEP device 120 built into the enclosure 102 for temporarily generating net DEP forces on micro-objects (not shown in FIG. 1) in liquid medium (not shown in FIG. 1) on the outer surface 124 of the DEP configuration 122. Depending on such characteristics as the frequency of a biasing device (e.g., 206 in FIG. 2) the dielectric properties of the liquid medium (e.g., 222 in FIG. 2), and/or the micro-objects (e.g., 224, 226), the DEP force can attract or repeal the nearby micro-objects. Similarly, each EW configuration 126 of the structure 104 can be part of a different EW device 130 built into the enclosure 102 for temporarily changing a wetting property of the electrowetting surface 128 or a region of the electrowetting surface 128 of the EW configuration 126.

Figure 2A:
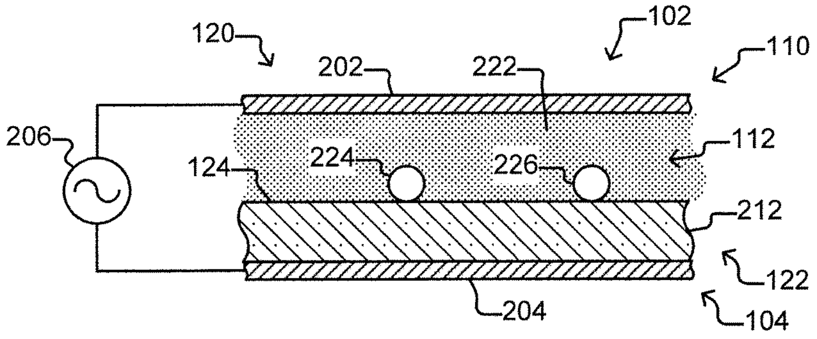
FIG. 2A is a partial, cross-sectional, side view of an example of a DEP device comprising one of the DEP configurations of FIG. 1 according to some embodiments of the invention.
Figure 2B:
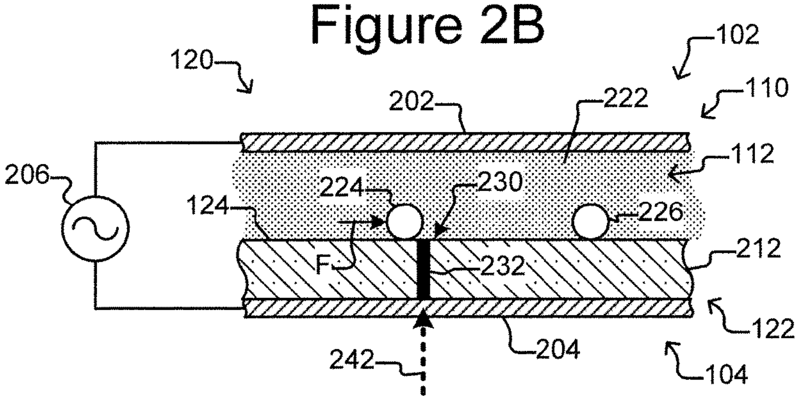
FIG. 2B shows an embodiment of a switchable element of the DEP device of FIG. 2A comprising a photoconductive material in which low impedance electrical paths can be created with a beam of light according to some embodiments of the invention.
Figure 3:
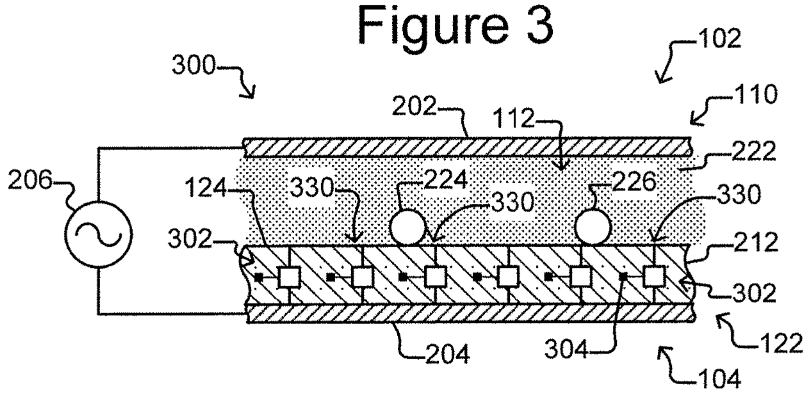
FIG. 3 is an example of an embodiment of a switchable element of the DEP device of FIG. 2A comprising switches for temporarily creating low impedance electrical paths between a biasing electrode and an outer surface of the switchable element according to some embodiments of the invention.
Figure 4:
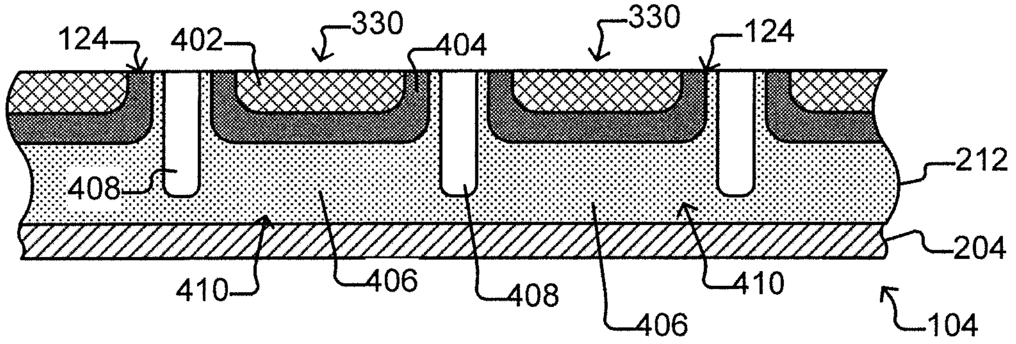
FIG. 4 shows an example in which the switches of FIG. 3 are implemented as transistors according to some embodiments of the invention.

FIGS. 2A and 2B (which show partial, cross-sectional, side views of the enclosure 102 of FIG. 1) illustrate an example of a DEP device 120. The DEP device 120 in FIG. 1 and each DEP device 120 in any figure (e.g., FIG. 11) can be configured like the DEP device 120 shown in FIGS. 2A and 2B or any variation thereof (e.g., as illustrated in FIG. 3 or 4).

As shown, a DEP device 120 can comprise a biasing electrode 202, a switchable element 212, and another biasing electrode 204 (which can be an example of a first electrode or a second electrode). The biasing electrode 202 can be part of the cover 102, and the switchable element 212 and the other biasing electrode 204 can be part of the structure 104. Alternatively, the biasing electrode 202 can also be part of the structure 104. The chamber 112 can be between the biasing electrode 202 and the switchable element 212, which can be located between the chamber 112 and the other biasing electrode 204. The chamber 112 is illustrated in FIG. 2A containing a first liquid medium 222 in which micro-objects 224, 226 (two are shown but there can be more) are disposed. As shown, the outer surface 124 can be an outer surface of the switchable element 212. Alternatively, a layer of material (not shown) can be disposed on the surface of the switchable element 212, and the outer surface 124 of that layer of material can comprise the outer surface 124. As noted, the outer surface 124 can be hydrophilic. Regardless of whether the outer surface 124 is an outer surface of the switching element itself 212 or the outer surface of a layer of material (e.g., a coating) (not shown) disposed on the switching element 212, the switching element 212 can be said to be disposed between the outer surface 124 and the electrode 204.

A first power source 206 (which can be part of the biasing device 118 of FIG. 1) can be connected to the electrodes 202, 204. The first power source 206 can be, for example, an alternating current (AC) voltage or current source. The first power source 206 can create a generally uniform electric field between the electrodes 202, 204 and a weaker field in the chamber 112, which can result in negligible DEP forces on each micro-object 224, 226 in the medium 222 on the outer surface 124 of the DEP configuration 122.

The impedance of the switchable element 212 can be greater than the impedance of the medium 222 in the chamber 112 so that the voltage drop due to the first power source 206 from the biasing electrode 202 to the other biasing electrode 204 is greater across the switchable element 212 than the voltage drop across the medium 222. As shown in FIG. 2B, the switchable element 212 can be configured, however, to temporarily create a low impedance path 232 (e.g., an electrically conductive path) from a region 230 at or adjacent to the outer surface 124 of the switchable element 212 to the other biasing electrode 204. The impedance of the low impedance path 232 can be less than the impedance of the medium 222. The voltage drop due to the first power source 206 across the medium 222 from the biasing electrode 202 to the region 230 can now be greater than the voltage drop from the region 230 through the low impedance path 232 to the other biasing electrode 204 while the voltage drop across the switchable element 212 otherwise generally remains greater than the voltage drop across the medium 222. This can alter the electric field in the medium 222 in the vicinity of the region 230, which can create a net DEP force F on a nearby micro-object 224. The force F, which as noted above can be configured to alternatively attract or repel the nearby micro-object 224, can be sufficient to move the micro-object 224 on the outer surface 124. By sequentially activating and deactivating multiple regions 230 on the surface 124, the micro-object 224 can be moved along the surface 124. As will be discussed in more detail with respect to FIG. 12A, the micro-object 224 can also be moved from the outer surface 124 of one DEP configuration 122 to the outer surface 124 of another DEP configuration 122.

In the example of the switchable element 212 shown in FIGS. 2A and 2B, the switchable element 212 can comprise a photoconductive material that has a relatively high electrical impedance except when directly illuminated with a beam of light 242. As shown, a narrow beam of light 242 directed onto a relatively small region 230 on or adjacent to the outer surface 124 can significantly reduce the impedance of the illuminated portion of the switchable element 212 thereby creating the low impedance path 232. In such an embodiment of the switchable element 212, a low impedance path 232 can be created from any region 230 at or adjacent to any location on the surface 124 of the switchable element 212 to the other biasing electrode 204 by directing a beam of light 242 at the desired location. The light 242 can be directed from the bottom as shown in FIG. 2B and/or from above (not shown) and thus through the electrode 202 and first medium 222.

FIG. 3 illustrates another example 300 of the DEP device 120. That is, the example DEP device 300 of FIG. 3 can replace any instance of the DEP device 120 in any of the figures.

As shown, rather than comprising a photoconductive material, the switchable element 212 of the DEP device 120 of FIG. 3 comprises one or more (six are shown but there can be fewer or more) switches 302 that can be temporarily activated to electrically connect a fixed region 330 on or adjacent to the surface 124 of the switching element 212 to the biasing electrode 204. Activating a switch 302 can thus create a low impedance path (like path 232 in FIG. 2B) from a fixed region 330 on or adjacent to the surface 124 of the switchable element 212 to the other biasing electrode 204. Otherwise, the DEP device 120 can be like the DEP device 120 of FIG. 2B and like numbered elements can be the same.

In FIG. 3, multiple switches 302 are shown connecting multiple relatively small regions 330 of the surface 124 to the electrode 204. In such an embodiment, a low impedance electrical path like path 232 in FIG. 2B can be temporarily created from any of the regions 330 to the electrode 204 by activating the corresponding switch 302. In such an embodiment, net DEP forces F (see FIG. 2B) can be selectively created with respect to the individual regions 330. Alternatively, there can be one switch 302 connecting the surface 124 to the electrode 204. In such an embodiment, the surface 124 is one region 330, and activating the switch 302 can temporarily create a net DEP force with respect to essentially the entire surface 124.

Each switch 302 can include a control 304 for activating (e.g., closing) and deactivating (e.g., opening) the switch 302. The switches 302 can be controlled in any manner. For example, the switches 302 can be controlled by the presence or absence of a beam of light on the control 304. As another example, the switches 302 can be toggled by directing a beam of light onto the control 304. As yet another example, the switches 302 can be electronically controlled rather than light controlled. The switches 302 can thus alternatively be controlled by providing control signals to the controls 304.

FIG. 4 illustrates an example configuration of the switches 302 of FIG. 3. In the example illustrated in FIG. 4, the switchable element 212 can comprise a semiconductor material, and each switch 302 can be a transistor 410 integrated into the semiconductor material of the switching element 212. For example, as shown, each transistor 410 can comprise a first region 402 at the outer surface 124, a second region 406 in contact with the biasing electrode 204, and a control region 404. The transistor 410 can be configured so that the first region 402 is electrically connected to the second region 406 to create a low impedance path (like the path 232 in FIG. 2B) from a fixed region 330 of the surface 124 to the biasing electrode 204 only when the control region 404 is activated.

In some embodiments, each transistor 410 can be activated and deactivated by beams of light. For example, each transistor 410 can be a phototransistor whose control region 404 is activated or deactivated by the presence or absence of a beam of light. Alternatively, the control region 404 of each transistor can be hardwired and thus activated and deactivated electronically.

The transistors 410 can be any type of transistor including bipolar transistors (BJTO) or field effect (FET) transistors. The body of the switching element 212 and thus the second region 406 of each transistor 410 can be doped with a first type of dopant (e.g., an n or p type dopant), and the first region 402 can also be doped with the first type of dopant. The control region 404, however, can be doped with a second type of dopant (e.g., the other of a p or an n type dopant). The first region 402 of each transistor 410 can be configured to be a source or a sink of holes, and the body of the switching element 212 and thus the second region 406 of each transistor 410 can be configured to be the other of a sink or source for holes. Thus, for example, if the transistors 410 are bipolar transistors, the first regions 402 can be emitters or collectors, the second regions 406 can be the other of collectors or emitters, and the control regions 404 can be bases of the transistors 410. As another example, if the transistors 410 are FET type transistors, the first regions 402 can be sources or drains, the second regions 406 can be the other of drains or sources, and the control regions 404 can be gates of the transistors 410.

As also shown in FIG. 4, isolation barriers 408 can be disposed in the switching element 212 between the transistors 410. The isolation barriers 408 can comprise, for example, trenches in the switching element 212, and the trenches can be filled with a switchable element.

The DEP devices 120, 300 illustrated in FIGS. 2A-4 are but examples of possible configurations of the DEP devices 120 in the apparatus 100. Generally speaking, the DEP devices 120 can be optoelectronic tweezers (OET) devices examples of which are disclosed in U.S. Pat. No. 7,612,355 or U.S. patent application Ser. No. 14/051,004. Other examples of the DEP devices 120 include electronically controlled electrodes.

Figure 5A:
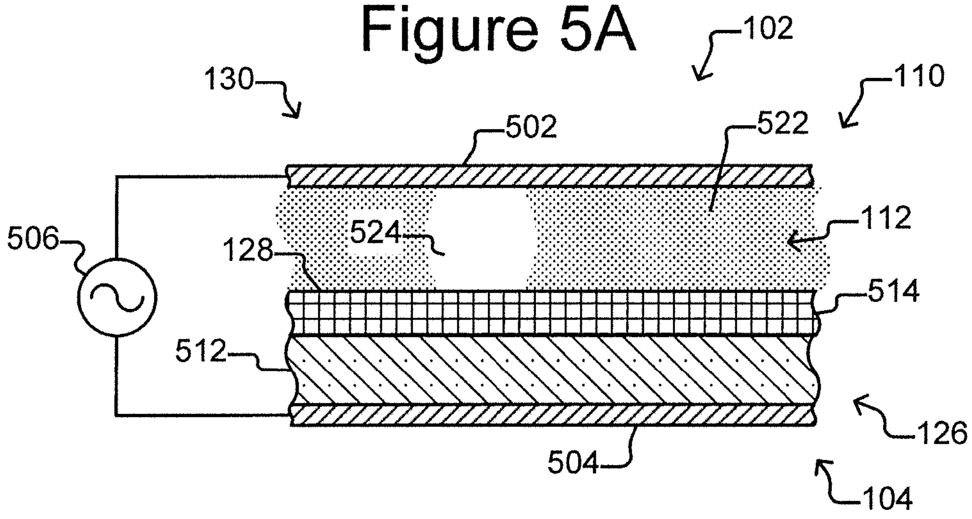
FIG. 5A is a partial, cross-sectional, side view of an example of an EW device comprising one of the EW configurations of FIG. 1 according to some embodiments of the invention.
Figure 5B:
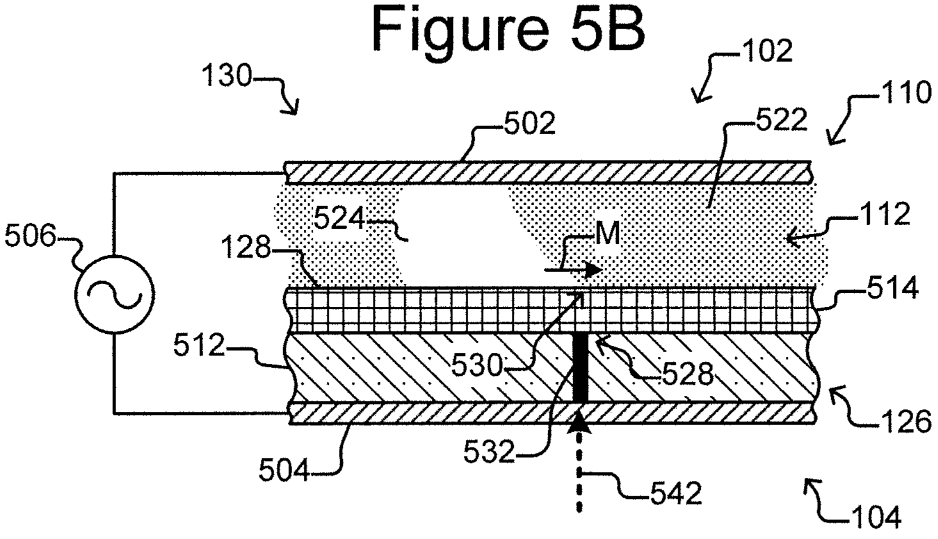
FIG. 5B shows an embodiment of a switchable element of the EW device of FIG. 5A comprising a photoconductive material in which a low impedance electrical path can be created with a beam of light according to some embodiments of the invention.
Figure 6:
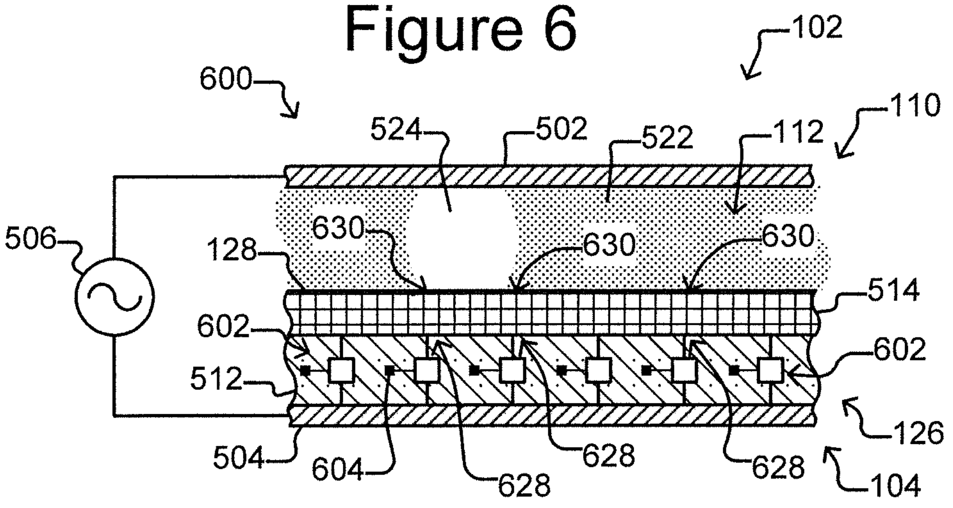
FIG. 6 is an example of an embodiment of the switchable element of the EW device of FIG. 5A comprising switches for temporarily creating low impedance electrical paths between a biasing electrode and an outer surface of the switchable element according to some embodiments of the invention.

FIGS. 5A and 5B (which show partial, cross-sectional, side views of the enclosure 102 of FIG. 1) illustrate an example of an EW device 130. Each EW device 130 in FIG. 1 (or any other figure (e.g., FIG. 11)) can be configured like the EW device 130 shown in FIGS. 5A and 5B or any variation thereof (e.g., as illustrated in FIG. 6).

As shown, an EW device 130 can comprise a biasing electrode 502, a dielectric material 514, a switchable element 512, and another biasing electrode 504 (which can be an example of a first or a second electrode). The biasing electrode 502 can be part of the cover 102, and the dielectric material 514, the switchable element 512, and the other biasing electrode 504 can be part of the structure 104. Alternatively, the biasing electrode 502 can also be part of the structure 104. The chamber 112 can be between the biasing electrode 502 and the dielectric material 514, and the switchable element 512 can be disposed between the dielectric material 514 and the biasing electrode 504. The chamber 112 is illustrated in FIG. 5A containing a droplet 524 of a second liquid medium in a third liquid medium 522. The first liquid medium 222 (see FIG. 2A), the second liquid medium, and the third liquid medium 522 can be any of many types of media. For example, the second medium of the droplet 524 can be a medium that is immiscible in the third medium 522. Thus, for example, the second medium of the droplet 524 can comprise an aqueous medium, and the third medium 522 can comprise an oil based medium. (Examples of suitable oils include gas permeable oils such as fluorinated oils. Fluorocarbon based oils are also examples of suitable oils.) As another example, the first medium 222 and the second medium of the droplet 524 can be the same type of medium.

Although shown as an outer surface of the dielectric material 514 itself, the electrowetting surface 128 can instead be an outer surface of a material (e.g., a coating) (not shown) disposed on the dielectric material 514. Regardless, the dielectric material 514 can be said to be between the electrowetting surface 128 and the switching element 512.

As shown, a second power source 506 (which can be part of the biasing device 118 of FIG. 1) can be connected to the electrodes 502, 504. The second power source 506 can be, for example, an alternating current (AC) voltage or current source. The second power source 506 can create a generally uniform electric field between the electrodes 502, 504, which can result in a negligible change of a contact angle of the droplet 524 on the electrowetting surface 128 of the EW configuration 126 and thus a negligible change in a wetting property of the electrowetting surface 128.

The impedance of the switchable element 512 can be greater than the impedance of the dielectric material 514 so that the voltage drop due to the second power source 506 from the biasing electrode 502 to the other biasing electrode 504 is greater across the switchable element 512 than the voltage drop across the dielectric material 514. As shown in FIG. 5B, the switchable element 512 can be configured, however, to temporarily create a low impedance path 532 (e.g., an electrically conductive path) from a region 528 at an interface between the switchable element 512 and the dielectric material 514 to the other biasing electrode 504. The impedance of the low impedance path 532 can be less than the impedance of the dielectric material 514. The voltage drop due to the second power source 506 across the dielectric material 514 can now be greater than the voltage drop from the region 528 through the low impedance path 532 to the other biasing electrode 504 while the voltage drop across other portions of the switchable element 512 remains greater than the voltage drop across the dielectric material 514. This can alter the electric field between the electrodes 502, 504 in the vicinity of the region 528, which can change the wetting property of the electrowetting surface 128 at a region 530 of the surface 128 adjacent to the region 528. For example, the foregoing can increase the wetting property of the electrowetting surface 128 at the region 530, which can cause the droplet 524 to move M to the region 530. As noted, the electrowetting surface 128 can be hydrophobic, but creating the low impedance path 532 can temporarily make the surface 128 at the region 530 less hydrophobic or even hydrophilic. By sequentially activating and deactivating regions 530 along the electrowetting surface 128, the droplet 524 can be moved along the electrowetting surface 128. As will be discussed in more detail with respect to FIGS. 12A-12C, the droplet 524 can also be moved from the electrowetting surface 128 of one EW device 130 to the electrowetting surface 128 of another EW device 130.

The switchable element 512 can be configured in any of the ways the switchable element 212 of FIGS. 2A and 2B can be configured. For example, the switchable element 512 shown in FIGS. 5A and 5B can comprise a photoconductive material that has a relatively high electrical impedance except when illuminated with a direct beam of light 542. As shown, a narrow beam of light 542 directed onto the region 528 can significantly reduced the impedance of the illuminated portion of the switchable element 512 thereby creating the low impedance path 532. In such an embodiment of the switchable element 512, a low impedance path 532 can be created from any region 528 anywhere at the interface between the switchable element 512 and the dielectric material 514 to the second electrode 504 by directing a beam of light 542 onto the region 528. The wetting property of a corresponding region 530 on the electrowetting surface 128 can thus be changed anywhere on the electrowetting surface 128.

FIG. 6 illustrates another example 600 of the EW device 130. That is, the example EW device 600 of FIG. 6 can replace any instance of the EW device 130 in any of the figures.

As shown, rather than comprising a photoconductive material, the switchable element 512 of the EW device 600 of FIG. 6 can comprise one or more (six are shown but there can be fewer or more) switches 602 that can be temporarily activated to electrically connect a fixed region 628 at the interface between the switchable element 512 and the dielectric material 514 to the biasing electrode 504. Activating a switch 602 can thus create a low impedance path (like path 532 in FIG. 5B) from a fixed region 528 at the interface between the switchable element 512 and the dielectric material 514 to the biasing electrode 504, which can change the wetting property at a corresponding fixed region 630 on the electrowetting surface 128. Otherwise, the EW device 600 can be like the EW device 130 of FIG. 5B and like numbered elements can be the same. Each of the switches 602 in the switchable element 512 can be configured, for example, as transistors generally like the transistors 410 illustrated in FIG. 4 and discussed above.

In FIG. 6, multiple switches 602 are shown connecting multiple relatively small regions 628 of the interface of the switchable element 512 to the dielectric material 514 (corresponding to multiple relatively small fixed regions 630 at or adjacent to the electrowetting surface 128) to the electrode 504. In such an embodiment, a wetting property of any of the regions 630 on the electrowetting surface 128 can be temporarily changed by activating a corresponding switch 602. Alternatively, there can be one switch 602 connecting the interface of the switchable element 512 to the dielectric material 514 to the electrode 504. In such an embodiment, the electrowetting surface 128 is one region 630, and activating the switch 602 can temporarily change a wetting property of essentially the entire electrowetting surface 128.

The EW devices 130, 600 illustrated in FIGS. 5A-6 are but examples of possible configurations of the EW devices 130 in the apparatus 100. Generally speaking, the EW devices 130 can be optoelectronic wetting (OEW) devices examples of which are disclosed in U.S. Pat. No. 6,958,132. Other examples of the EW devices 130 include electrowetting on dielectric (EWOD) devices, which can be electronically controlled.

Figure 9:
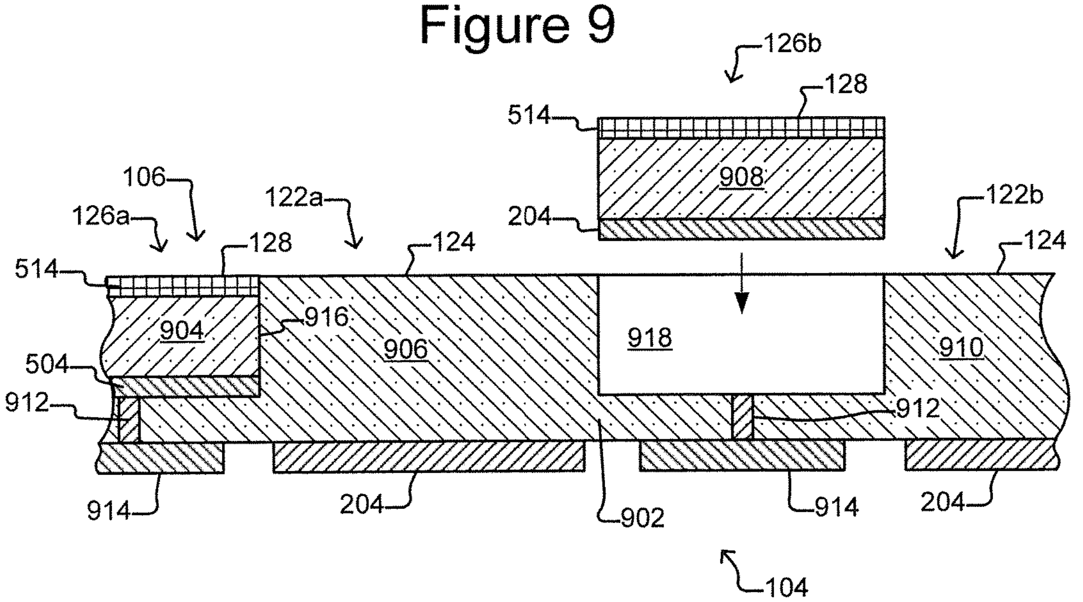
FIG. 9 is an example in which a structure of the microfluidic apparatus of FIG. 1 comprises a support structure, where DEP configurations are integrated into sections of the support structure and stand alone distinct EW configurations are disposed in cavities in the support structure according to some embodiments of the invention.

The structure 104 of FIG. 1 can be physically configured to comprise one or more DEP configurations 122 and one or more EW configurations 126 in any of a variety of ways. FIGS. 7-9 illustrate examples.

In the example shown in FIG. 7, multiple DEP configurations 122 and multiple EW configurations 126 can be integrated into a single monolithic component 702. As shown, the structure 104 can comprise a monolithic component 702, and the DEP configurations 122 and EW configurations 126 can comprise sections 704-710 of the monolithic component 702. The monolithic component 702 can comprise a semiconductor material.

For example, as shown, a first EW configuration 126*a* can comprise a dielectric material 514 disposed on one side of a first section 704 of the monolithic component 702 and an electrode 504 on the other side of the first section 704, which can be configured like switchable element 512 illustrated in FIGS. 5A-6. For example, the first section 704 can comprise photoconductive material generally like the switchable element 512 shown in FIG. 5B. As another example, the first section 704 can comprise one or more switches like the switches 602 in FIG. 6, which can be configured as transistors like the transistors 410 of FIG. 4 as discussed above. A second EW configuration 126*b* can similarly comprise another dielectric material 514 disposed on one side of a third section 708 of the monolithic component 702 and another electrode 504 on the other side of the third section 708, which can be configured like the switchable element 512 illustrated in any of FIGS. 5A-6.

A first DEP configuration 122*a* can comprise a second section 706 of the monolithic component 702 and an electrode 204 disposed adjacent to the second section 706, which can be configured like the switchable element 212 illustrated in FIGS. 2A-4. For example, the second section 706 can comprise photoconductive material generally like the switchable element 212 shown in FIG. 2B. As another example, the second section 706 can comprise one or more switches like the switches 302 in FIG. 3, which can be configured as transistors like the transistors 410 of FIG. 4. A second DEP configuration 122*b* can similarly comprise a fourth section 710 of the monolithic component 702 and another electrode 204 disposed adjacent to the fourth section 710, which can be configured like the switchable element 212 illustrated in any of FIGS. 2A-4.

In the example shown in FIG. 8, the DEP configurations 122 and the EW configurations 126 can comprise distinct structures. For example, as shown, a first EW configuration 126*a* can be a distinct structure that comprises a dielectric material 514 disposed on one side of a first EW configuration switching element 804 and an electrode 504 on the other side of the switching element 804. The switching element 804 can comprise, for example, semiconductor material, a printed circuit board, or the like. The switching element 804 can be configured like switchable element 512 illustrated in any of FIGS. 5A-6. For example, the switching element 804 can comprise photoconductive material generally like the switchable element 512 shown in FIG. 5B. As another example, the switching element 804 can comprise one or more switches like the switches 602 in FIG. 6, which can be configured as transistors like the transistors 410 of FIG. 4 as discussed above. A second EW configuration 126*b* can also be a distinct structure that comprises another dielectric material 514 disposed on one side of a second EW configuration switching element 808 and another electrode 504 on the other side of the switching element 808. The switching element 808 can be the same as or similar to the switching element 804 as discussed above.

A first DEP configuration 122*a* can be a distinct structure that comprises a first DEP configuration switching element 806 and an electrode 204. The switching element 806 can comprise, for example, semiconductor material, a printed circuit board, or the like. The switching element 806 can be configured like the switchable element 212 illustrated in any of FIGS. 2A-4. For example, the switching element 806 can comprise photoconductive material generally like the configuration of the switchable element 212 shown in FIG. 2B. As another example, the switching element 806 can comprise one or more switches like the switches 302 in FIG. 3, which can be configured as transistors like the transistors 410 of FIG. 4 as discussed above. A second DEP configuration 122*b* can also be a distinct structure that comprises a second DEP configuration switching element 810 and another electrode 204. The switching element 810 can be like the switching element 806 as discussed above.

As shown in FIG. 8, the EW configurations 126*a*, 126*b* and the DEP configurations 122*a*, 122*b* can be disposed on a master structure 814. The EW configurations 126*a*, 126*b* and the DEP configurations 122*a*, 122*b* can be arranged in any pattern on the master structure 814. For example, the EW configurations 126*a*, 126*b* and the DEP configurations 122*a*, 122*b* can be disposed side by side and spaced apart by spacers 812 as illustrated. As another example, in some embodiments, there are no spacers 812, and adjacent to EW configurations 126*a*, 126*b* and DEP configurations 122*a*, 122*b* can be abutted against each other.

Some embodiments do not include a master structure 814. For example, in some embodiments, there is not a master structure 814, but the EW configurations 126*a*, 126*b* and the DEP configurations 122*a*, 122*b* are adhered one to another.

For example, the spacers 812 illustrated in FIG. 8 can be an adhesive that adheres sides of adjacent to EW configurations 126*a*, 126*b* and DEP configurations 122*a*, 122*b* to each other.

Although not shown, provisions can be provided for connecting power supplies (e.g., 206 and 506 in FIGS. 2A and 5A) to the electrodes 204, 504. For example, the master structure 814 can comprise one or more electrically conductive connectors (not shown) to the electrodes 204 and one or more electrically conductive connectors (not shown) to the electrodes 504. Examples of such connectors include electrically conductive vias (not shown) through the master structure 814.

Regardless, the EW configurations 126*a*, 126*b* and the DEP configurations 122*a*, 122*b* can be positioned so that the electrowetting surfaces 128 of the EW configurations 126*a*, 126*b* and the outer surfaces 124 of the DEP configurations 122*a*, 122*b* are substantially parallel and/or substantially in a same plane. The electrowetting surfaces 128 and the outer surfaces 124 can thus form the boundary 106 of the structure 104. The boundary 106 can thus be a composite surface comprising multiple outer surfaces 124 of multiple DEP configurations 122 and multiple electrowetting surfaces 128 of multiple EW configurations 126.

In the example shown in FIG. 9, the DEP configurations 122 can comprise sections of a master switching element 902, and the EW configurations 126 can comprise stand alone, distinct structures disposed in cavities 916, 918 in the master switching element 902.

As shown, a first EW configuration 126*a* can be a stand alone, distinct structure that comprises a dielectric material 514 disposed on one side of a first EW configuration switching element 904 and an electrode 504 on the other side of the switching element 904. The switching element 904 can comprise, for example, semiconductor material. The switching element 904 can be configured like switchable element 512 illustrated in any of FIGS. 5A-6. For example, the switching element 904 can comprise photoconductive material generally like the switchable element 512 shown in FIG. 5B. As another example, the switching element 904 can comprise one or more switches like the switches 602 in FIG. 6, which can be configured as transistors like the transistors 410 of FIG. 4 as discussed above. A second EW configuration 126*b* can also be a stand alone, distinct structure that comprises another dielectric material 514 disposed on one side of a second EW configuration switching element 908 and another electrode 504 on the other side of the switching element 908. The switching element 908 can comprise, for example, semiconductor material, which can be configured like the switching element 904 as discussed above. The EW configurations 126*a*, 126*b* can be disposed in cavities 916, 918 in the master switching element 902.

A first DEP configuration 122*a* can comprise a first section 906 of the master switching element 902 and an electrode 204 disposed adjacent to the first section 906, which can be configured like the switchable element 212 illustrated in any of FIGS. 2A-4. For example, the first section 906 can comprise photoconductive material generally like the switchable element 212 shown in FIG. 2B. As another example, the first section 906 can comprise one or more switches like the switches 302 in FIG. 3, which can be configured as transistors like the transistors 410 of FIG. 4. A second DEP configuration 122*b* can similarly comprise a second section 910 of the master switching element 902 and another electrode 204 disposed adjacent to the second section 910, which can be configured like the switchable element 212 illustrated in FIGS. 2A-4.

As shown, the sections 906, 910 of the master switching element 902 that correspond to the DEP configurations 122*a*, 122*b* can be disposed between the cavities 916, 918 in which the EW configurations 126*a*, 126*b* are disposed. The cavities 916, 918 and the EW configurations 126*a*, 126*b* can be sized and positioned such that the outer surfaces 124 of the DEP configurations 122*a*, 122*b* and the electrowetting surfaces 128 of the EW configurations 126*a*, 126*b* and are substantially parallel and/or substantially in a same plane. The outer surfaces 124 and the electrowetting surfaces 128 can thus form the boundary 106 of the structure 104.

In the example shown in FIG. 9, the DEP configurations 122 comprise sections 906, 910 of a master switching element 902, and the EW configurations 126 are stand alone, distinct structures disposed in cavities 916, 918 in a master switching element 902. Alternatively, the EW configurations 126 can comprise sections (e.g., like sections 906, 910) of the master switching element 902, and the DEP configurations 122 can be stand alone, distinct structures (e.g., like the EW configurations 126 shown in FIG. 9) disposed in cavities 916, 918 of the master switching element 902.

In any of the embodiments illustrated in FIGS. 7-9, the first power source 206 can be connected to each of the electrodes 204 and corresponding electrodes 202 (not shown in FIGS. 7-9) generally as shown in FIGS. 2A-3. All of the electrodes 204 in FIGS. 7 and 8 can, for example, be electrically connected to each other. Similarly, the second power source 406 can be connected to the electrodes 504 and corresponding electrodes 502 (not shown in FIGS. 7 and 8) in the embodiments of FIGS. 7 and 8. The embodiment of FIG. 9 can also facilitate connecting the second power source 506 to the electrodes 504 of the EW configurations 126. For example, as shown in FIG. 9, the second power source 506 can connect to electrodes 914, which are connected (e.g., by electrical connections 912 such as vias, electrically conductive adhesive, or the like) to the electrodes 504 of the EW configurations 126.

Figure 10:
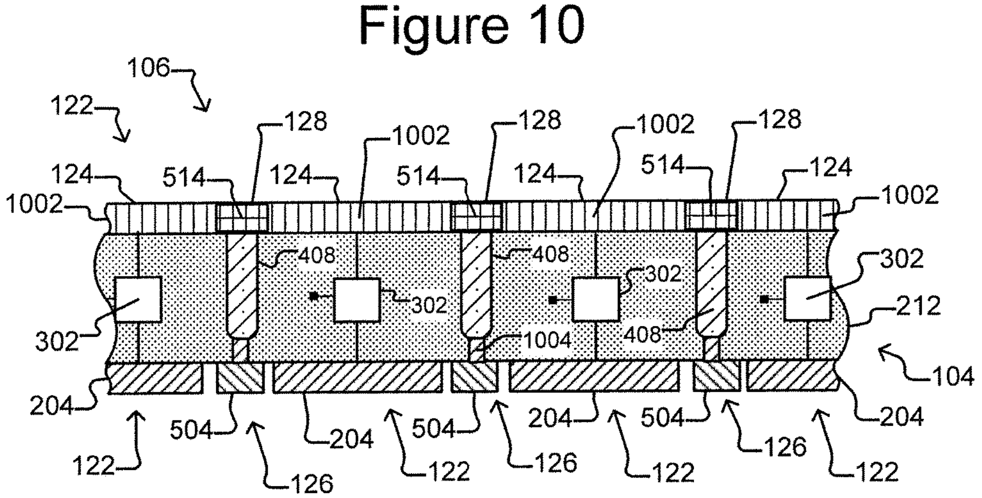
FIG. 10 shows an example in which a structure of the microfluidic apparatus of FIG. 1 comprises DEP configurations in which switches are embedded into a switchable element and EW configurations that comprise photoconductive material in embedded isolation barriers according to some embodiments of the invention.

FIG. 10 illustrates an example of the structure 104 comprising the switchable element 212 configured somewhat as shown in FIG. 3, and like numbered elements in FIGS. 3 and 10 can be the same. As shown, the switching element 212 can comprise multiple DEP configurations 122 and multiple EW configurations 126. Each of the DEP configurations 122 can comprise a hydrophilic layer 1002 comprising the outer surface 124, which can thus be hydrophilic; an electrode 204; and a switch 302 for selectively creating a low impedance path (e.g., like path 232 in FIG. 2B) through the switchable element 212 to the electrode 204 as discussed above.

As also shown, the switching element 212 can also include isolation barriers 408 between the DEP configurations 122, which can be part of the EW configurations 126. For example, each EW configuration 126 can comprise a dielectric material 514 comprising an electrowetting surface 128, photoconductive material disposed in one of the isolation barriers 408, and an electrode 504. As shown, an electrical connector 1004 (e.g., a via) can electrically connect the photoconductive material in an isolation barrier 408 to a corresponding electrode 504. Light directed onto the photoconductive material in one of the isolation barriers 408 can create a low impedance path (like path 532 in FIG. 5B) through the photoconductive material in the illuminated barrier 408 to the electrode 504 and thereby change a wetting property of the electrowetting surface 128 of the EW configuration 126 generally as discussed above with respect to FIG. 5B.

The apparatus 100 of FIG. 1, including any variation discussed above or illustrated in FIGS. 2A-10, is an example only. FIG. 11 illustrates another example configuration of the apparatus 100.

The apparatus 100' of FIG. 11 can be generally similar to the apparatus 100 of FIG. 1, and like numbered elements can be the same. As shown, however, the structure 104' in FIG. 11 comprises multiple DEP devices 120 (each corresponding to one of the illustrated DEP configurations 122) and multiple EW devices 130 (each corresponding to one of the EW configurations 126). Some or all of the DEP devices 120 and EW devices 130 can be positioned such that the outer surfaces 124 of the DEP configurations 122 and the electrowetting surfaces 128 of the EW configurations 126 of the structure 104' are disposed in an alternating pattern. For example, all or one or more portions of the pattern of DEP devices 120 and EW devices 130 can be such that rows and columns of the pattern comprise alternating outer surfaces 124 and electrowetting surfaces 128 generally as shown in FIG. 11.

Figure 12A:
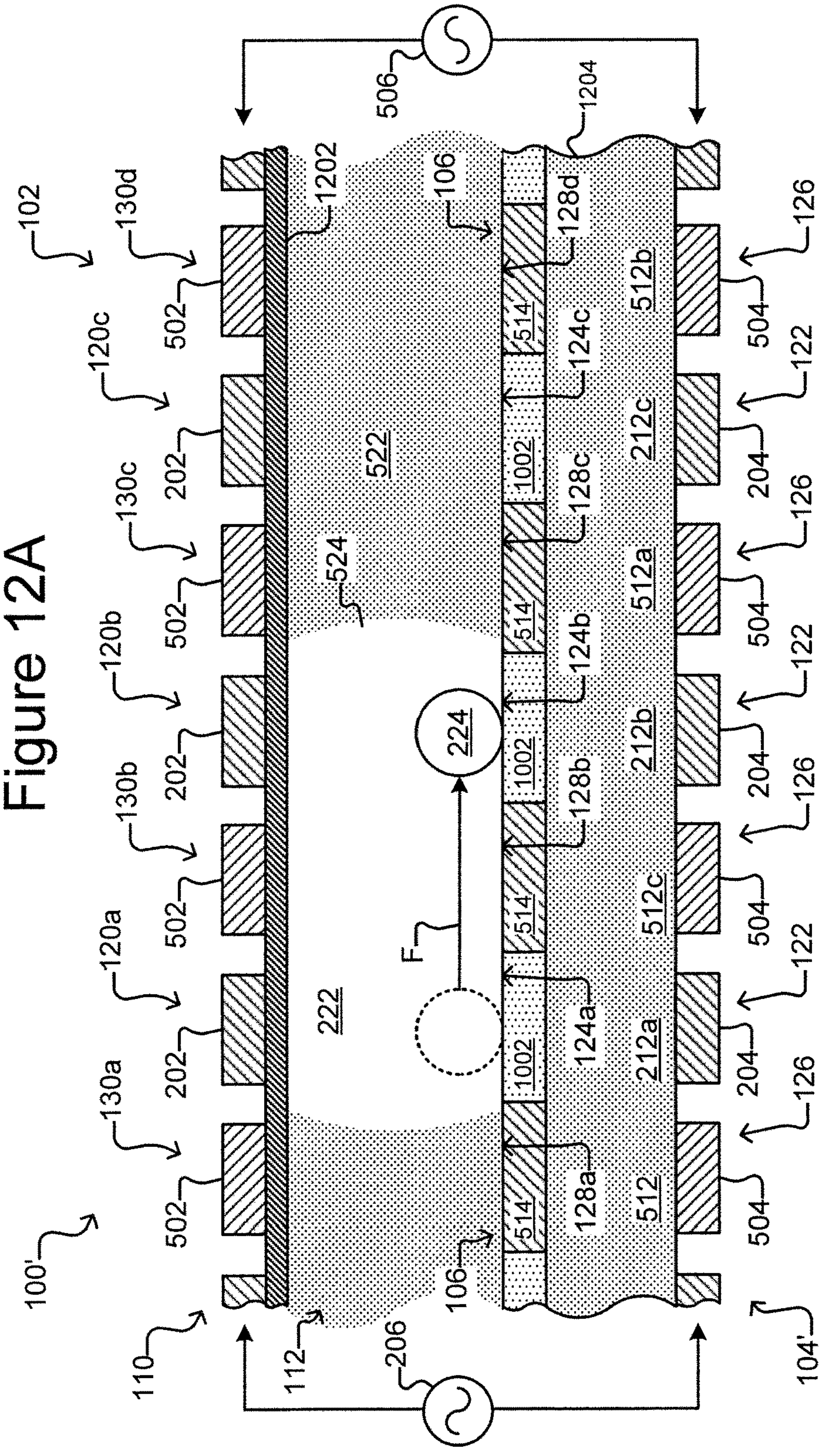
FIGS. 12A-12C show partial, cross-sectional, side views of the enclosure of FIG. 11 and illustrate an example of operation of the microfluidic apparatus of FIG. 11 according to some embodiments of the invention.
Figure 12B:
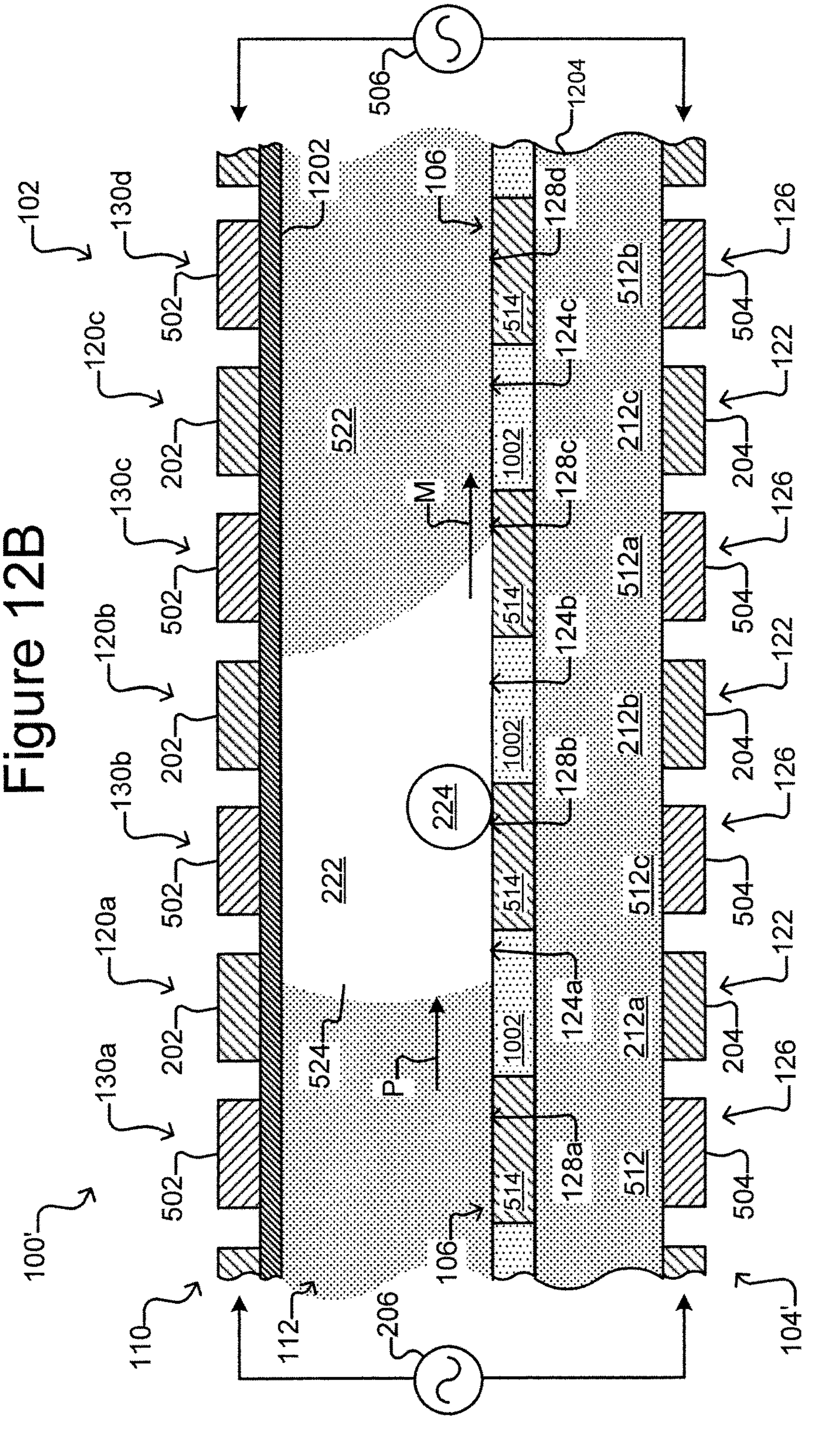
Figure 12C:
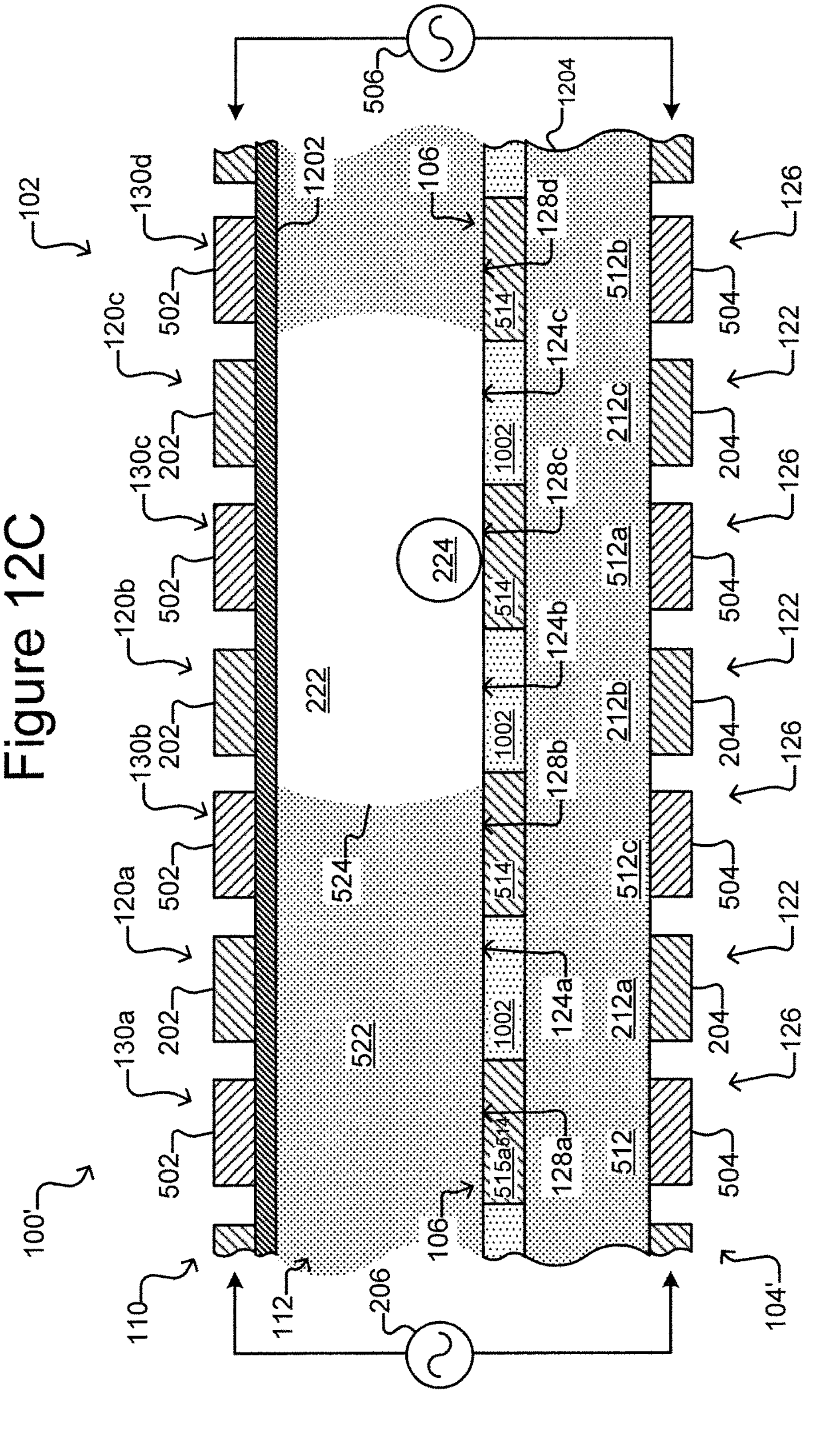

FIGS. 12A-12C show partial, cross-sectional, side views of the enclosure 102 of the apparatus 100' of FIG. 11 and also illustrates an example of operation of the apparatus 100'.

As shown in FIG. 12A, each DEP device 120 can comprise an electrode 202 that can be part of the cover 110. In FIG. 12A, the cover 110 is illustrated as also comprising a support structure 1202 for the electrodes 202. Each DEP device 120 can also comprise a switchable element 212 and another electrode 204 generally as discussed above with respect to FIG. 2A. Each DEP device 120 can also include a hydrophilic material 1002 that comprises the outer surface 124, which can thus be hydrophilic. Otherwise, each DEP device 120 can be configured and operate in any manner disclosed herein including the examples shown in FIGS. 2A-4. The first power source 206 can be connected to the biasing electrodes 202 and 204. In some embodiments, the biasing electrodes 202 on support 1202 can be interconnected with each other, and the biasing electrodes 204 on the switching element 1204 can similarly be interconnected with each other.

Each EW device 130 can comprise an electrode 502 that can be part of the cover 110 as shown. Each EW device 130 can also comprise a dielectric material 514, switchable element 512, and another electrode 504 generally as discussed above with respect to FIG. 5A. The second power source 506 can be connected to the biasing electrodes 502 and 504. In some embodiments, the biasing electrodes 502 on support 1202 can be interconnected with each other, and the biasing electrodes 504 on the switching element 1204 can similarly be interconnected with each other. Each EW device 130 can be configured and operate in any manner disclosed herein including the examples shown in FIGS. 5A-6.

Examples of operation of the apparatus 100' are illustrated in FIGS. 12A-12C and FIGS. 14A-14C.

As shown in FIG. 12A, a micro-object 224 initially disposed on an outer surface **124*a* of a first DEP device 120*a* can be moved to the outer surface 124*b* of a nearby DEP device 120*b* (e.g., a second DEP device) by activating the nearby DEP device 120*b* generally as described above (e.g., creating an electrically conductive path like path 232 in FIG. 2B through the switchable element 212*b* of the nearby DEP configuration 122*b*) without also activating the first DEP device 120*a*. As discussed above, the foregoing can create a net DEP force on the micro-object 224 sufficient to move the micro-object 224 from the outer surface 124*a* of the first DEP device 120*a* to the outer surface 124*b* of the nearby DEP device 120*b*). As shown, the micro-object 224 can be moved from the outer surface 124*a* across an intervening electrowetting surface 128*b* of an adjacent EW device 130*b*. As also shown, the micro-object 224 can be moved while inside a droplet 524 of the first medium 222, which can be disposed in the second medium 522**.

As also illustrated in FIGS. 12A-12C, a droplet 524 can be moved on the structural boundary 106. For example, as shown in FIGS. 12A-12C, a droplet 524, initially disposed in a first location (e.g., on outer surfaces **124*a*, 124*b* of DEP devices 120*a*, 120*b* and an electrowetting surface 128*b* of a first EW device 128*b* in the example shown in FIG. 12A), can be moved to a second location by activating a nearby EW device 130*c* generally as described above (e.g., creating an electrically conductive path like path 532 in FIG. 5B through the switchable element 512*a* of the nearby EW device 130*b*) and thereby decreasing the hydrophobicity of the electrowetting surface 128*c* of the nearby EW device 130*c* sufficiently to draw an edge of the droplet 524 across the electrowetting surface 128*c* to the outer surface 124*c* of a DEP device 120*c* near the EW device 130*c* as illustrated in FIG. 12B. The foregoing can be done without also activating the electrowetting surface 128*b*. The droplet 524 can thus be moved from a first position on the surfaces 124*a*, 128*b*, 124*b* shown in FIG. 12A to a second position on the surfaces 124*b*, 128*a*, 124*c* as shown in FIG. 12C. As illustrated in FIG. 12B, liquid pressure P (e.g., applied through an inlet 114 or by a pressure device (not shown) in the chamber 112) can aide in moving M the droplet 524. As also shown in FIGS. 12B and 12C, the micro-object 224 can move with the droplet 524 without activating any of the DEP devices 122. Droplets like droplet 524, however, can be moved whether or not the droplet 524 contains one or more micro-objects like micro-object 224**.

Although not shown in FIGS. 12A-12C, the foregoing operations of moving a micro-object 224 and a droplet 524 can be performed simultaneously in the apparatus 100' of FIGS. 11 and 12A-12C. For example, a micro-objet 224 can be moved in one droplet 524 as illustrated in FIG. 12A while another droplet (not shown in FIGS. 12A-12C but can be like droplet 524) can be moved generally in the same way that the droplet 524 is moved in FIGS. 12A-12C.

Figure 13:
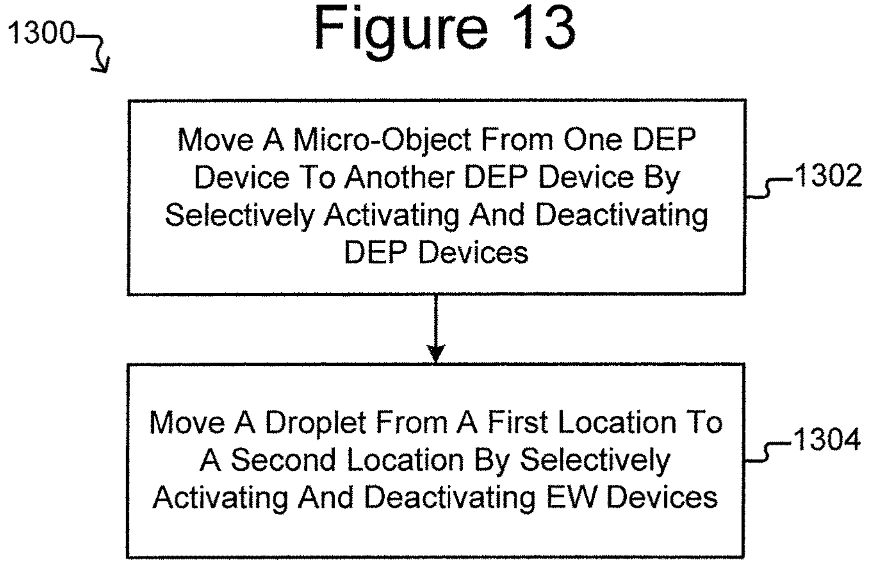
FIG. 13 is an example of a process for operating the apparatus of FIG. 11 in accordance with the operations illustrated in FIGS. 12A-12C according to some embodiments of the invention.

FIG. 13 shows an example of a process 1300 by which the apparatus 100' of FIG. 11 can be operated generally in accordance with the examples shown in FIGS. 12A-12C. As shown at step 1302, the process 1300 can move a micro-object from one DEP device to Another by Selectively activating and deactivating as needed one or more DEP devices, which can be performed generally as discussed above (e.g., as illustrated in FIG. 12A). At step 1304, the process 1300 can move a droplet from a first location to a second location, which can also be performed generally as discussed above (e.g., as shown in FIGS. 12A-12C). Indeed, the process 1300 can be performed in accordance with the examples illustrated in FIGS. 12A-12C including any variation or additional steps or processing discussed above with respect to FIGS. 12A-12C.

Figure 14A:
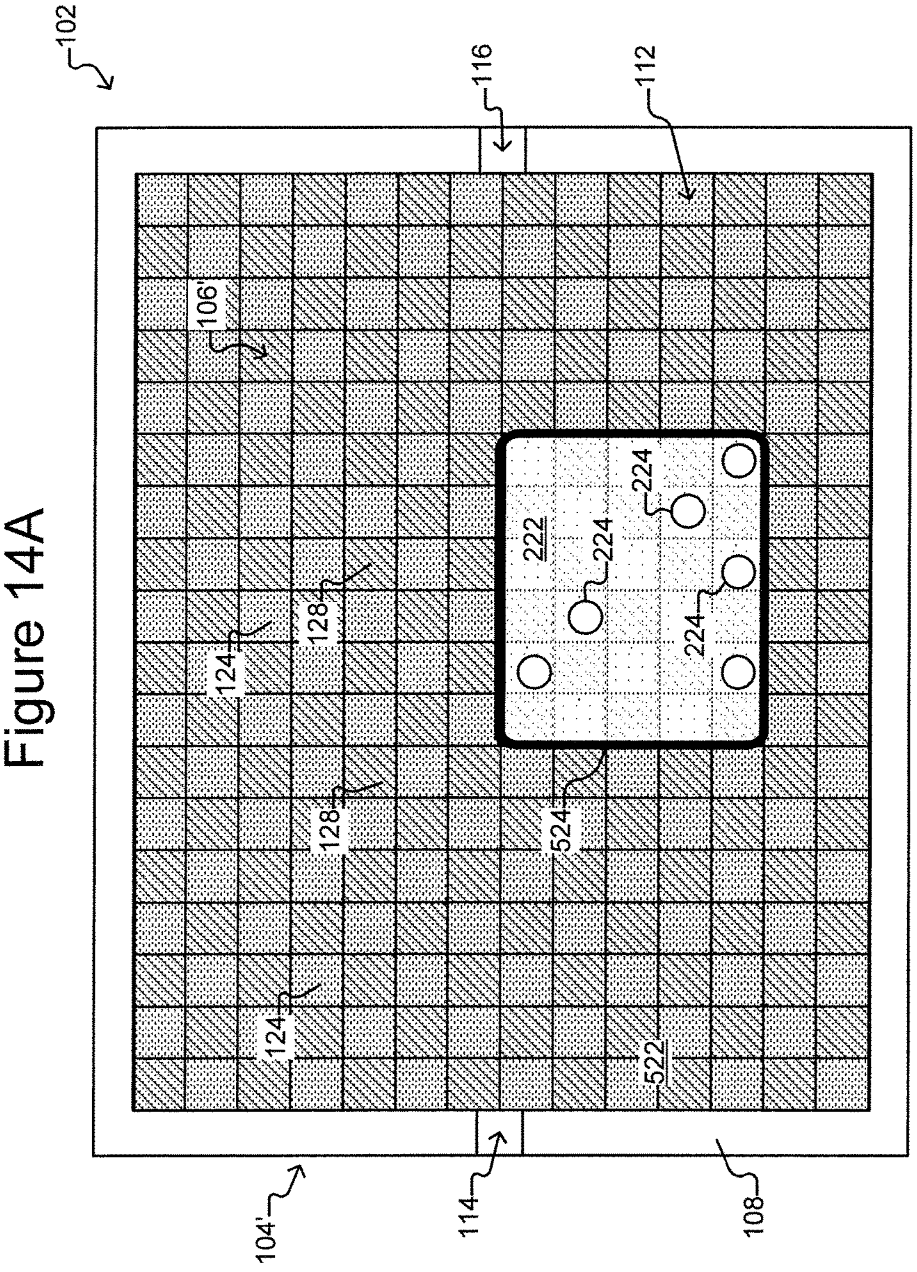
FIGS. 14A-14C show top views of the enclosure of FIG. 11 with the cover removed and illustrate another example of operation of the microfluidic apparatus of FIG. 11 according to some embodiments of the invention.
Figure 14B:
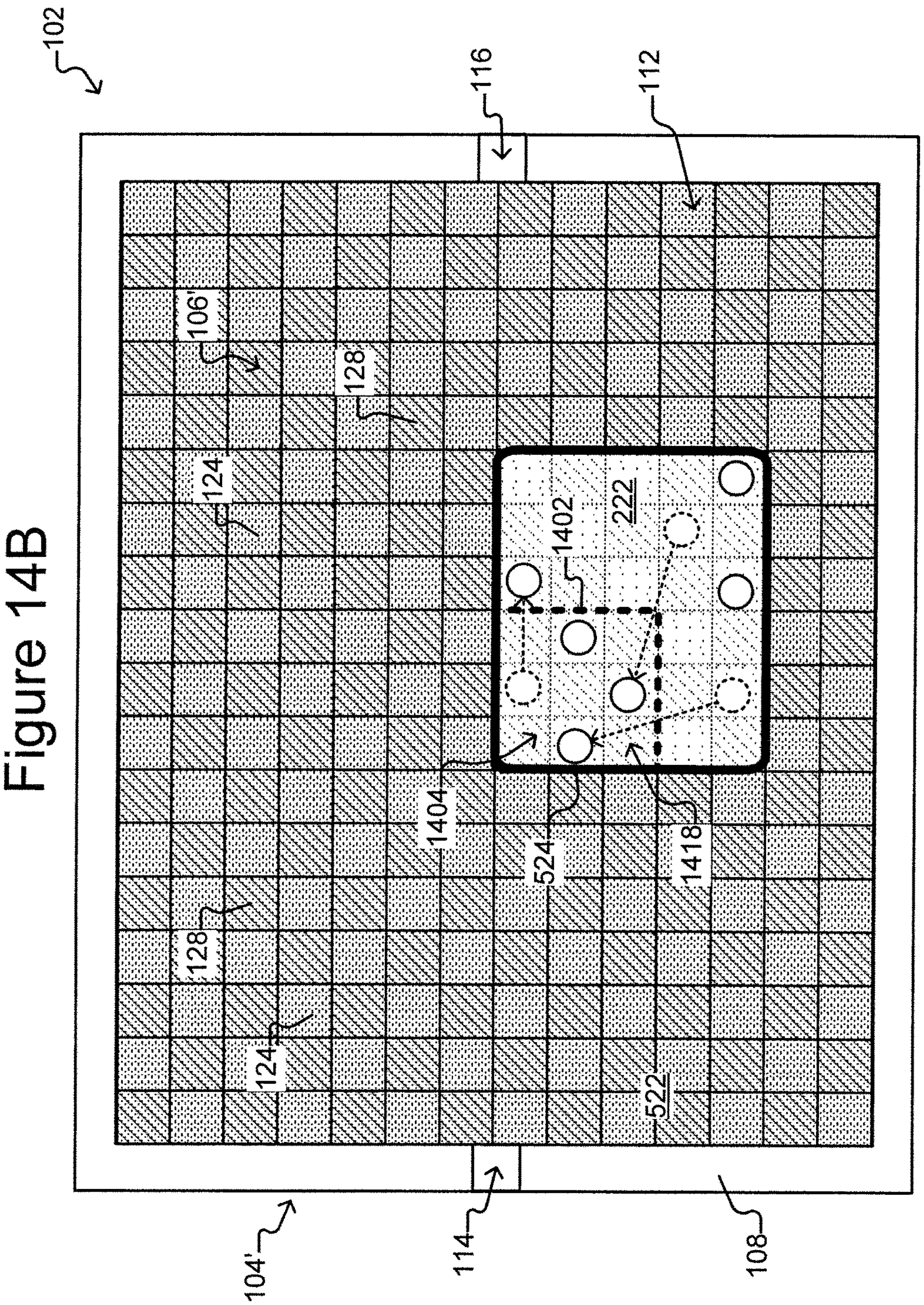
Figure 14C:
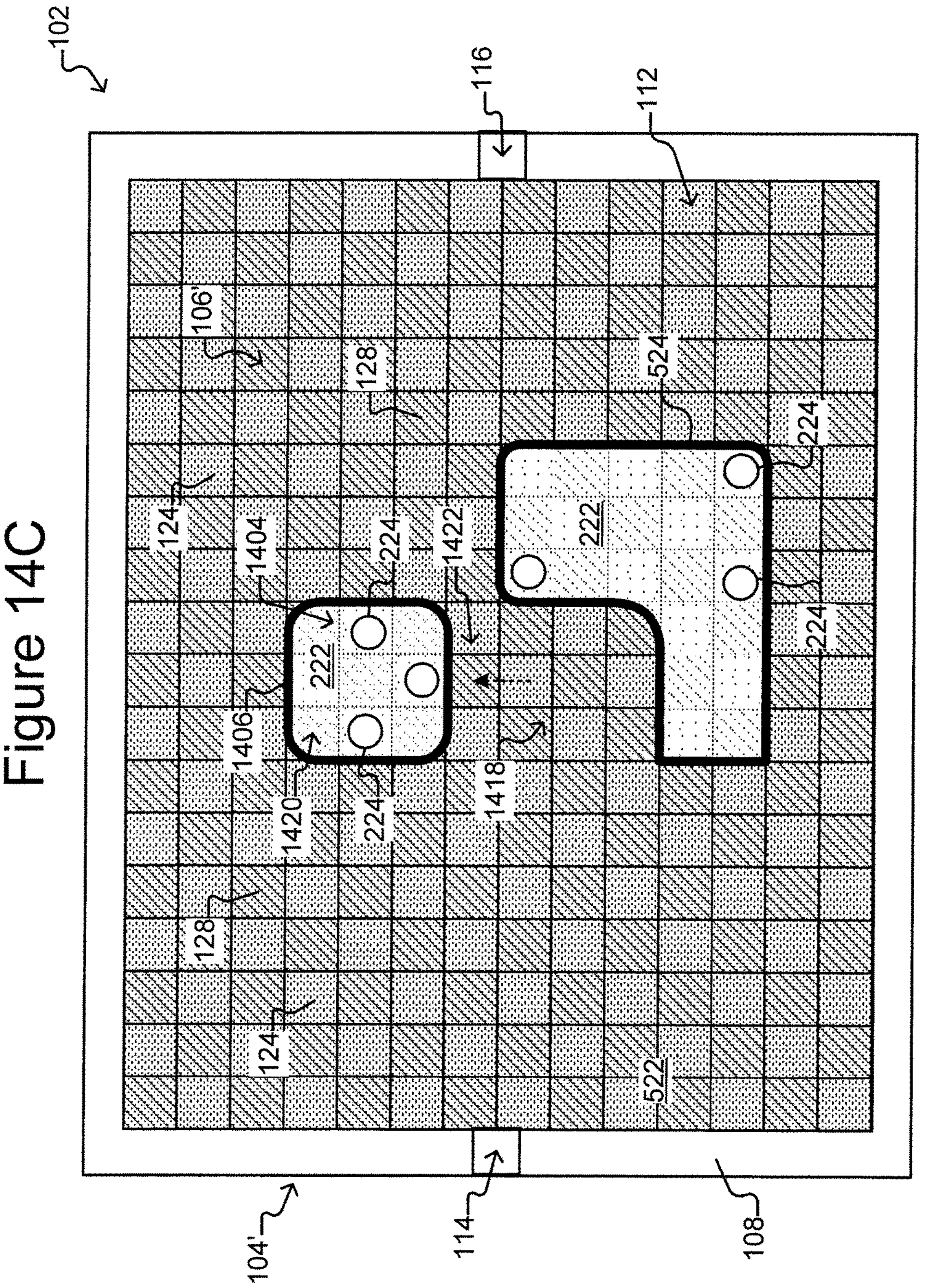

FIGS. 14A-14C illustrate another example of an operation of the microfluidic device 100' of FIG. 11. FIGS. 14A-14C show a top view of the apparatus 100' with its cover 110 removed. Biasing devices 206, 506 are not shown but can be connected to the apparatus 100' generally as shown in FIGS. 12A-12C.

In the example shown in FIG. 14A, a droplet 524 of the first medium 222 is disposed in the second medium 522 in the chamber 112, and micro-objects 224 can be disposed inside the droplet 524. As shown in FIG. 14B, one or more of the micro-objects 224 in the droplet 524 can be moved into or out of a selected sub-region 1402 of the droplet 524 until there is a selected group 1404 of the micro-objects in the sub-region 1402 of the droplet 524. As shown in FIG. 14C, the sub-region 1402 of the droplet 524 can be moved away and thus separate from the droplet 524 forming a new droplet 1406 that contains the selected group 1404 of micro-objects 224. The micro-objects 224 can be moved (as shown in FIG. 14B) generally as discussed above (e.g., from the outer surface 124 of one DEP device 120 (not shown in FIGS. 14A-14C) to the outer surface 124 of a nearby DEP device 120 (not shown in FIGS. 14A-14C), and the sub-region 1404 can be moved and thus pulled away and separated from the droplet 524 to form a new droplet 1406 generally as discussed above (e.g., by selectively changing a wetting property of ones of the electrowetting surfaces 128 of adjacent ones of the EW devices 130 (not shown in FIGS. 14A-14C).

For example, the sub-region 1402 of the droplet 524 can initially be disposed in a first location 1418 in the chamber 112 as shown in FIG. 14B. The location 1418 can include first outer surfaces 124 of a first set of the DEP devices 122 and first electrowetting surfaces 128 of a first set of the EW devices 130 on which the sub-region 1402 is initially disposed as shown in FIG. 14B. Generally in accordance with the discussion above of moving droplets, the sub-region 1402 can be separated from the droplet 524, forming a new droplet 1406, by moving the sub-region 1402 of the droplet to a second location 1420 as shown in FIG. 14C. The second location 1420 can include second outer surfaces 124 of a second set of the DEP devices 122 and second electrowetting surfaces 128 of a second set of the EW devices 130. The sub-region 1402 can be moved from the first location 1418 to the second location 1420 by, for example, sequentially activating one or more (one is shown but there can be more) of the EW devices 130 in a third location 1422. (The EW devices 130 in the third location 1422 can be an example of a third set of the EW devices 130 and their electrowetting surfaces 128 can be an example of third electrowetting surfaces.) This can be done, for example, without also activating EW devices 130 on whose electrowetting surfaces 128 all of the droplet 524 except for the sub-region 1402 is disposed. Generally as discussed above, this can move the sub-region 1402 of the droplet 524 over the third location 1422. Thereafter, the EW devices 128 in the third location 1422 can be deactivated, and one or more of the EW devices 130 in the second location can be activated, which generally as discussed above, can further move the sub-region 1402 (now a new droplet 1406) to the second location 1420 shown in FIG. 14C.

A new droplet 1406 can be created from an existing droplet 524 as illustrated in FIGS. 14A-14C regardless of whether there are any micro-objects 224 in the existing droplet 524 or the new droplet 1406. Moreover, more than one new droplet (not shown but can be like new droplet 1406) can be created from the existing droplet 524.

Figure 15:
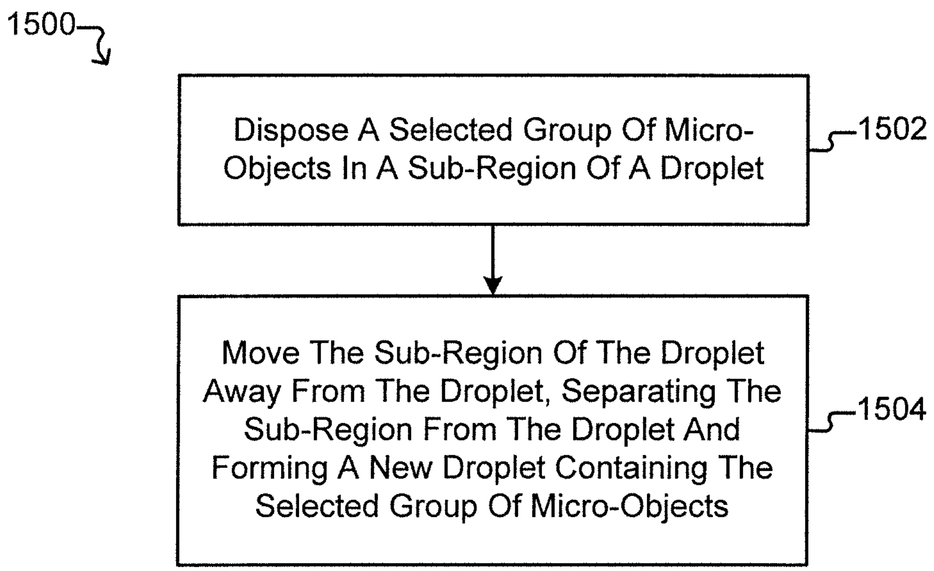
FIG. 15 is an example of a process for operating the apparatus of FIG. 11 in accordance with the operations illustrated in FIGS. 14A-14C according to some embodiments of the invention.

FIG. 15 illustrates an example of a process 1500 by which the apparatus 100' of FIG. 11 can be operated generally in accordance with the examples shown in FIGS. 14A-14C. As shown at step 1502, the process 1500 can dispose a selected group of micro-objects in a sub-region of a droplet, which can be performed generally as discussed above (e.g., as illustrated in FIGS. 14A and 14B). At step 1504, the process 1500 can move the sub-region of the droplet away from the droplet, separating the sub-region from the droplet and thereby forming a new droplet, which can also be performed generally as discussed above (e.g., as shown in FIG. 14C). Indeed, the process 1500 can be performed in accordance with any of the examples illustrated in FIGS. 14A-14C including any variation or additional steps or processing discussed above with respect to FIGS. 14A-14C.

Although specific embodiments and applications of the invention have been described in this specification, these embodiments and applications are exemplary only, and many variations are possible.

We claim:

1. A process of operating a microfluidic apparatus comprising a chamber, dielectrophoresis (DEP) devices, and electrowetting (EW) devices, said process comprising:

moving a micro-object from a first outer surface of a first of said DEP devices to a second outer surface of a second of said DEP devices by activating said second DEP device and thereby creating a net DEP force on said micro-object in a direction of said second DEP device; and moving a droplet of a liquid medium from a first location to a second location in said chamber by activating a second set of said EW devices and thereby changing a wetting property of second electrowetting surfaces of said second set of EW devices, wherein:

in said first location said droplet is disposed in part on first electrowetting surfaces of a first set of said EW devices but not on said second electrowetting surfaces of said second set of EW devices, and in said second location said droplet is disposed in part on said second electrowetting surfaces of said second set of EW devices but not on said first electrowetting surfaces of said first set of EW devices.

2. The process of claim 1, wherein moving said droplet comprises moving part of said droplet over an outer surface of one of said DEP devices disposed between said first set of EW devices and said second set of EW devices.

3. The process of claim 2, wherein:

said outer surface of said one of said DEP devices is hydrophilic, and said first electrowetting surfaces and said second electrowetting surfaces are hydrophobic.

4. The process of claim 3, wherein changing said wetting property of said second electrowetting surfaces comprises temporarily reducing a hydrophobicity of said second electrowetting surfaces.

5. The process of claim 3, wherein changing said wetting property of said second electrowetting surfaces comprises temporarily changing said second electrowetting surfaces from hydrophobic to hydrophilic.

6. The process of claim 1, wherein moving said micro-object comprises moving said micro-object from said first outer surface across an electrowetting surface of an adjacent one of said first set of EW devices to said second outer surface.

7. The process of claim 1, wherein:

a structural boundary of said chamber comprises said first outer surface, said second outer surface, said first electrowetting surfaces, and said second electrowetting surfaces.

8. The process of claim 1, further comprising performing both of said moving steps substantially simultaneously.

9. The process of claim 1, wherein:

said micro-object is disposed in said droplet, and moving said droplet further comprises said micro-object moving with said droplet.

10. A process of manipulating a droplet of liquid medium in a microfluidic apparatus comprising a chamber, dielectrophoresis (DEP) devices, and electrowetting (EW) devices, said process comprising:

disposing a droplet of a first liquid medium on first outer surfaces of a first set of said DEP devices and first electrowetting surfaces of a first set of said EW devices;

separating a first part of said droplet from a second part of said droplet by activating second electrowetting surfaces of a second set of said EW devices and thereby changing a wetting property of said second electrowetting surfaces.

11. The process of claim 10, wherein said separating comprises moving said first part of said droplet from a first location comprising said first outer surfaces of said first set of said DEP devices and said first set of electrowetting surfaces of said first EW devices to a second location comprising second outer surfaces of a second set of said DEP devices and said second electrowetting surfaces of said second set of said EW devices.

12. The process of claim 11, wherein said separating comprises:

activating third electrowetting surfaces of a third set of said EW devices disposed between said first set of said EW devices and said second set of said EW devices, and thereafter activating said second electrowetting surfaces of said second set of EW devices.

13. The process of claim 12, wherein:

none of said DEP devices in said second set of DEP devices is also in said first set of DEP devices, none of said EW devices in said second set of EW devices is also in said first set of EW devices or said third set of EW devices, and none of said EW devices in said first set of EW devices is also in said third set of EW devices.

14. The process of claim 12, wherein said second location is separated from and does not overlap said first location.

15. The process of claim 11, wherein separating said first part of said droplet comprises a first group of micro-objects disposed in said first part of said droplet moving with said first part of said droplet from said first location to said second location.

16. The process of claim 15 further comprising, prior to said separating said first part of said droplet, selecting said first group of micro-objects from a larger group of micro-objects in said droplet.

17. A structure comprising:

a dielectrophoresis (DEP) configuration comprising an outer surface, a first electrode, and a first switchable element disposed between said outer surface and said first electrode, wherein said first switchable element is configured to temporarily create an electrically conductive first path from a first region of said outer surface through said first switchable element to said first electrode; and an electrowetting (EW) configuration comprising an electrowetting surface, a second electrode, a dielectric layer disposed between said electrowetting surface and said second electrode, and a second switchable element disposed between said dielectric layer and said second electrode, wherein said second switchable element is configured to temporarily create an electrically conductive second path through said second switchable element and thereby change a wetting property of a second region of said electrowetting surface adjacent to said second path, wherein said DEP configuration is disposed adjacent to said EW configuration such that said outer surface of said DEP configuration is adjacent to said electrowetting surface, wherein said first switchable element of said DEP configuration comprises a first switch from said first region of said outer surface through said first switchable element to said first electrode; and/or, wherein said second switchable element of said EW configuration comprises a second switch from said second region of said electrowetting surface through said second switchable element to said second electrode.

18. The structure of claim 17, wherein:

said first switchable element of said DEP configuration comprises a photoconductive material, and selectively illuminating a portion of said photoconductive material adjacent to said first region reduces an impedance of said portion creating said first path; and/or, said second switchable element of said EW configuration comprises a photoconductive material;

and selectively illuminating a portion of said photoconductive material adjacent to said second region changes said wetting property of said second region of said electrowetting surface adjacent to said second path.

19. The structure of claim 18, wherein said first switchable element of said DEP configuration is light activated.

20. The structure of claim 18, wherein said second switchable element of said EW configuration is light activated.

21. The structure of claim 17, wherein said first switch and/or said second switch is light activated.

22. The structure of claim 17, wherein said first switch comprises a first transistor embedded in said first switchable element; and/or, wherein said second switch comprises a second transistor embedded in said second switchable element.

23. The structure of claim 17, wherein said first switchable element further comprises isolation barriers in said first switchable element about said first switch; and/or, said second switchable element further comprises isolation barriers in said second switchable element about said second switch.

24. The structure of claim 23, wherein said second switchable element of said EW configuration comprises photoconductive material disposed in said isolation barriers.

25. The structure of claim 17, wherein said outer surface of said DEP configuration is substantially parallel to said electrowetting surface of said EW configuration.

26. The structure of claim 25, further comprising a monolithic component, wherein:

a first section of said monolithic component comprises said first switchable element of said DEP configuration, and a second section of said monolithic component comprises said second switchable element of said EW configuration.

27. The structure of claim 25, further comprising a support structure, wherein:

a first section of said support structure comprises said first switchable element of said DEP configuration, and said EW configuration is disposed in a cavity in a second section of said support structure adjacent to said first section.

28. The structure of claim 17, wherein:

said DEP configuration is a first distinct device, and said EW configuration is a second distinct device disposed adjacent to said DEP configuration, and said outer surface of said DEP configuration is substantially parallel to said electrowetting surface of said EW configuration.

29. The structure of claim 17, wherein said outer surface of said DEP configuration and said electrowetting surface of said EW configuration are substantially parallel.

30. The structure of claim 29, wherein said outer surface of said DEP configuration and said electrowetting surface of said EW configuration are substantially in a same plane.

31. The structure of claim 29, wherein said outer surface of said DEP configuration and said electrowetting surface of said EW configuration form a substantially continuous composite surface.

32. The structure of claim 17, further comprising:

a plurality of said DEP configurations each comprising an outer surface, and a plurality of said EW configurations each comprising an electrowetting surface, wherein at least some of said DEP configurations and some of said EW configurations are disposed such that said outer surfaces and said electrowetting surfaces are in alternating patterns.

33. The structure of claim 32, wherein said outer surfaces of said DEP configurations and said electrowetting surfaces of said EW configurations are substantially in a same plane.

34. The structure of claim 32, wherein said outer surfaces of said DEP configurations and said electrowetting surfaces of said EW configurations form a substantially continuous composite surface.

35. The structure of claim 32, wherein:

said outer surfaces of said DEP configurations are hydrophilic, and said electrowetting surfaces of said EW configurations are hydrophobic.

* * * * *